(12) United States Patent
Ishizaki et al.

(10) Patent No.: US 6,254,990 B1
(45) Date of Patent: Jul. 3, 2001

(54) SURFACE-CROSSLINKING PROCESS FOR WATER-ABSORBENT RESIN

(75) Inventors: Kunihiko Ishizaki, Suita; Teruyuki Kanto; Shigeru Sakamoto, both of Himeji; Nobuyuki Harada, Suita; Kazuhisa Hitomi, Himeji, all of (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 09/250,477

(22) Filed: Feb. 14, 1999

(30) Foreign Application Priority Data

Feb. 18, 1998 (JP) .................................................. 10-036197

(51) Int. Cl.$^7$ ....................................................... C08F 8/14
(52) U.S. Cl. .................. 428/402; 525/329.7; 525/330.1; 525/384
(58) Field of Search .......................... 428/402; 525/329.7, 525/330.1, 384

(56) References Cited

U.S. PATENT DOCUMENTS

| | | |
|---|---|---|
| 4,734,478 | 3/1988 | Tsubakimoto et al. . |
| 5,002,986 | 3/1991 | Fujiura et al. . |
| 5,122,544 | 6/1992 | Bailey et al. . |
| 5,314,420 | 5/1994 | Smith et al. . |
| 5,385,983 | 1/1995 | Graham . |
| 5,399,591 | 3/1995 | Smith et al. . |
| 5,409,771 | 4/1995 | Dahmen et al. . |
| 5,422,405 | 6/1995 | Dairoku et al. . |
| 5,451,613 | 9/1995 | Smith et al. . |
| 5,462,972 | 10/1995 | Smith et al. . |
| 5,486,569 | 1/1996 | Henderson et al. . |
| 5,597,873 | 1/1997 | Chambers et al. . |
| 5,633,316 | 5/1997 | Gartner et al. . |
| 5,712,316 | 1/1998 | Dahmen et al. . |

FOREIGN PATENT DOCUMENTS

| | | |
|---|---|---|
| 0 450 923 A2 | 10/1991 | (EP) . |
| 0 450 924 A2 | 10/1991 | (EP) . |
| 0 467 073 A1 | 1/1992 | (EP) . |
| 0 668 080 A2 | 8/1995 | (EP) . |
| 0 695 763 A1 | 2/1996 | (EP) . |
| 0 744 435 A1 | 11/1996 | (EP) . |
| 0 812 873 A1 | 12/1997 | (EP) . |
| 0 827 753 A2 | 3/1998 | (EP) . |
| 3-285918 | 12/1991 | (JP) . |
| WO 94/09043 | 4/1994 | (WO) . |

*Primary Examiner*—Donald R. Wilson

(57) ABSTRACT

The present invention provides a surface-crosslinking process of a water-absorbent resin to obtain a water-absorbing agent which has high absorption speed and excellent absorption capacity under a load (a water-absorbent resin which has specific or larger values of properties). In a process comprising the step of adding a crosslinking agent to a dry water-absorbent resin powder to thereby crosslink the neighborhood of its surface, the surface-crosslinking is carried out while the resin powder having a weight-average particle diameter of 200 to 1,000 $\mu$m is pulverized.

17 Claims, 3 Drawing Sheets

SURFACE-CROSSLINKING PROCESS FOR WATER-ABSORBENT RESIN

BACKGROUND OF THE INVENTION

A. Technical Field

The present invention relates to a surface-crosslinking process for a water-absorbent resin, particularly, a surface-crosslinking process of a water-absorbent resin to obtain a water-absorbing agent which displays fast absorption speed and excellent absorption capacity under a load (a water-absorbent resin which has specific or larger values of properties).

In addition, the present invention relates to: a water-absorbing agent which contains only a small quantity. of fine particles and is excellent in absorption capacity under a load, liquid-permeability under a load, and impact resistance; and a production process for such a water-absorbing agent.

B. Background Art

In recent years, water-absorbent resins which display water absorption from tens of times to hundreds of times its own weight have been developed, and a variety of water-absorbent resins are used for the purposes which need water absorption or water retention, for example, in sanitary material fields such as sanitary articles and paper diapers, or in agricultural and horticultural fields, or in food fields such as freshness retention, or in industrial fields such as condensation prevention and coldness retention materials.

Known examples of such a water-absorbent resin include: hydrolysates of starch-acrylonitrile graft polymers (JP-B-49-043395); neutralization products of starch-acrylic acid graft polymers (JP-A-51-125468); saponification products of vinyl acetate-acrylic acid ester copolymers (JP-A-52-014689); hydrolysates of acrylonitrile copolymers or acrylamide copolymers (JP-B-53-015959), or their crosslinked matters; self-crosslinking type sodium polyacrylates as obtained by reversed-phase suspension polymerization (JP-A-53-046389); and crosslinked matters of partially neutralized polyacrylic acids (JP-A-55-084304).

The abilities that are demanded of water-absorbent resins are different according to the purposes for which they will be used, but examples of properties as desired of water-absorbent resins for sanitary materials include: high absorption capacity under a load, fast absorption speed, and high liquid-permeability, upon contact with aqueous liquids. However, relations between these properties do not necessarily display positive correlations, so it was difficult to improve these properties simultaneously.

Among the above properties, two properties of absorption speed and absorption capacity under a load are desired of the water-absorbent resin as fundamental properties. Thus, the following materials are, for example, proposed: sanitary materials using a water-absorbent resin of high water absorption speed and high absorption capacity under a load in a high concentration of 60 weight % or more of its core (U.S. Pat. No. 5,149,335), and a water-absorbent resin which exhibits a high absorption capacity of 12 g/g or more under a load of 60 g/cm$^2$ and has high water absorption speed (U.S. Pat. No. 5,712,316, EP 0707603).

Then, as attempts to enhance the absorption speed of the water-absorbent resin, attempts are for example made to decrease the particle diameter of the water-absorbent resin, or to granulate the water-absorbent resin, or to form the water-absorbent resin into scales, for the purpose of enlarging the surface area of the water-absorbent resin. However, when the water-absorbent resin is formed into a small particle diameter, the water-absorbent resin forms so-called "fisheyes" due to contact with aqueous liquids, so that the absorption speed is decelerated rather than accelerated. In addition, when the water-absorbent resin is granulated, each of the resultant granules themselves falls into a state of "fisheyes" due to contact with aqueous liquids, so that the absorption speed is decelerated rather than accelerated. In addition, when the water-absorbent resin is formed into scales, its absorption speed is improved, but is still insufficient because gel-blocking is induced, and further, forming the water-absorbent resin into scales is uneconomical in that the resultant water-absorbent resin is necessarily bulky and therefore needs larger facilities for transportation and storage.

Thus, as means other than means for improving the surface area of the above water-absorbent resin, there are also some proposed arts in which molecular chains in the neighborhood of the surface of the water-absorbent resin are crosslinked to raise the crosslinking density of the surface layer, namely, the formation of "fisheyes" is prevented by surface-crosslinking to raise the absorption speed. In addition, such surface-crosslinking is especially important for raising the absorption capacity under a load of the water-absorbent resin.

Such arts are, for example, disclosed in JP-A-57-044627, JP-A-58-042602, JP-B-60-018690, JP-A-58-180233, JP-A-59-062665, JP-61-016903, U.S. Pat. No. 5,422,405, U.S. Pat. No. 5,597,873, U.S. Pat. No. 5,409,771, EP 450923, EP 450924, EP 668080. Furthermore, there is a known process in which the granulation of water-absorbent resin is carried out simultaneously with its surface-crosslinking for the purpose of attaining the surface-crosslinking which improves the water absorption speed (WO 91/17200, Publication of Internal Patent Application as entered the national phase in Japan (Kohyo) No. 06-216042, and U.S. Pat. No. 5,002,986, U.S. Pat. No. 5,122,544, U.S. Pat. No. 5,486,569, EP 695763). In addition, there is also a known art in which the particle size is kept constant during surface-crosslinking (all examples of preferred embodiments as set forth in JP-A-58-042602). Furthermore, there is also a known art in which a crosslinking agent is added to a hydrogel, and the resultant mixture is dried and then divided finely and then further crosslinked (U.S. Pat. No. 5,145,906, U.S. Pat. No. 5,385,983, U.S. Pat. No. 5,447,727, U.S. Pat. No. 563,316).

Indeed the water absorption speed of the water-absorbent resin may be improved to some extent by the above surface-crosslinking, but it is actually necessary to enlarge the specific surface area of the resultant water-absorbent resin for the purpose of obtaining a water-absorbent resin having high water absorption speed, because the water absorption speed of the water-absorbent resin, fundamentally, greatly depends on the contact area with liquids to be absorbed.

Thus, there is a proposed art in which a foamed water-absorbent resin is further surface-crosslinked (Publication of Internal Patent Application as entered the national phase in Japan (Kohyo) No. 08-509521, and JP-A-05-237378, JP-A-63-088410, WO 96/17884, U.S. Pat. No. 5,314,420, U.S. Pat. No. 5,399,591, U.S. Pat. No. 5,451,613, U.S. Pat. No. 5,462,972, EP 574435, EP 707603, EP 744435). In addition, there is also a known art in which the average particle diameter is finely controlled.

However, when the water absorption speed is raised by enlarging the specific surface area of the water-absorbent resin (to be surface-crosslinked) by foaming the resin or decreasing its average particle diameter to the fine size, the water-absorbent resin (to be surface-crosslinked) absorbs the crosslinking agent (as added for surface-crosslinking) in a moment, so that it is difficult to uniformly coat the surface of the water-absorbent resin with the surface-crosslinking agent. Therefore, generally, because the water-absorbent resin of a large specific surface area displays too fast absorption speed, it is difficult to uniformly surface-crosslink such a water-absorbent resin, so the resultant absorption capacity under a load is low.

Furthermore, the above control of the average particle diameter further causes problems of fine particles. That is to say, it is generally preferable that the amount of fine particles with a particle diameter less than 150 μm in the water-absorbent resin is as low as possible, in view of liquid-permeability, dust-generatability, and workability, and further in view of properties for absorbent articles. However, the fine control of the average particle diameter to increase the specific surface area results in formation of a large amount of fine particles as by-products, and accompanying this increase of fine particles, the properties of the water-absorbent resin deteriorates or the cost rises due to recovery of fine particles. Furthermore, industrial fine control of the particle diameter is difficult because of stability of the particle size, and results in scattering of the properties of the water-absorbent resin such as absorption capacity under load and water absorption speed.

That is to say, the two properties of water absorption speed and absorption capacity under a load, which are the most fundamental properties of the water-absorbent resin, conflict, because as the specific surface area of the water-absorbent resin increases, the uniform surface-crosslinking gets more difficult

SUMMARY OF THE INVENTION

A. Objects of the Invention

Therefore, an object of the present invention is to solve problems in actualities that in spite of strong demands for water-absorbent resins having high water absorption speed and high absorption capacity under a load, it is difficult to uniformly coat a water-absorbent resin of a large specific surface area with a surface-crosslinking agent, and that it is therefore difficult to surface-crosslink such a resin, in other words, in the present state of affairs where the water absorption speed and the absorption capacity under a load are contrary to each other. Thus, an object of the present invention is to obtain a water-absorbing agent having high water absorption speed and high absorption capacity under a load.

In addition, another object of the present invention is to stably obtain a water-absorbing agent which contains only a small quantity of fine particles and has excellent strength in a dry state, and displays high absorption capacity under a load and high liquid-permeability under a load, in other words, to stably obtain a water-absorbing agent which is very excellent in affinity with aqueous liquids, and is improved with regard to both water absorption capacities under no load and under a load when compared with conventional ones, and further, is enhanced with regard to the liquid-permeability and the swollen-gel strength.

B. Disclosure of the Invention

The present inventors studied and studied with encouragement to themselves and great efforts to achieve the above object. As a result, they completed the present invention by finding that there are some known arts in which the granulation is carried out during surface-crosslinking (WO 91/17200 and Publication of Internal Patent Application as entered the national phase in Japan (Kohyo) No. 06-216042), or in which the particle size is kept constant so as not to be changed by surface-crosslinking (all examples of preferred embodiments as set forth in JP-A-58-042602), but that, surprisingly, if water-absorbent resin particles are surface-crosslinked while at least part of the resin particles are pulverized in a process of adding a crosslinking agent to the resin particles to crosslink the neighborhood of their surface, then the resultant surface-crosslinked water-absorbent resin satisfies both the water absorption speed and the absorption capacity under a load.

In addition, the present inventors completed the present invention by finding that if the particle diameter of the water-absorbent resin powder is controlled to that of large coarse particles before surface-crosslinking, and further if the neighborhood of the surface of the resin powder is crosslinked while at least part of particles of the resin powder are pulverized, then a water-absorbing agent is obtainable, which agent contains only a small quantity of fine particles and is excellent with regard to the absorption capacity under a load and the strength in a dry state.

Thus, a surface-crosslinking process for a water-absorbent resin, according to the present invention, comprises the step of adding a crosslinking agent to a dry water-absorbent resin powder, thereby crosslinking the neighborhood of its surface, and is characterized in that the surface-crosslinking is carried out while the resin powder having a weight-average particle diameter of 200 to 1,000 μm is pulverized.

A surface-crosslinking process for a water-absorbent resin, according to the invention, is characterized in that in a process, the pulverization of the resin powder during surface-crosslinking reduces the weight-average particle diameter of the resin powder by 1 to 50%.

A surface-crosslinking process for a water-absorbent resin, according to the invention, is characterized in that in a process, the pulverization of the resin powder during surface-crosslinking merely generates fine particles of 150 μm or below of the resin powder by at most 10 weight % of the entire resin powder.

A surface-crosslinking process for a water-absorbent resin, according to the invention, is characterized in that in a process, the pulverization of the resin powder during surface-crosslinking increases the BET specific surface area of the resin powder to 1.05 to 10 times.

A surface-crosslinking process for a water-absorbent resin, according to the invention, is characterized in that in a process, granulation of the resin powder is also carried out simultaneously with the pulverization of the resin powder during surface-crosslinking.

A surface-crosslinking process for a water-absorbent resin, according to the invention, is characterized in that in a process, the resin powder has a specific bulk gravity of 0.6 to 0.1 (g/cc) before surface-crosslinking.

A surface-crosslinking process for a water-absorbent resin, according to the invention, is characterized in that in a process, the resin powder is porous before surface-crosslinking.

A surface crosslinking process for a water-absorbent resin, according to the invention, is characterized in that in a process, 90 weight % or more of the resin powder comprises coarse particles of 150 μm or more before surface-crosslinking.

A surface-crosslinking process for a water-absorbent resin, according to the invention, is characterized in that in a process, 25 weight % or more of the resin powder comprises coarse particles of 600 μm or more before surface-crosslinking.

A surface-crosslinking process for a water-absorbent resin, according to the invention, is characterized in that in a process, before being surface-crosslinked, the resin powder merely has so low absorbency that its absorption capacity for a physiological salt solution is 35 (g/g) or less.

A surface-crosslinking process for a water-absorbent resin, according to the invention, is characterized in that in a process, the pulverization of the resin powder during surface-crosslinking is carried out under a load of 20 g/cm$^2$ or in the presence of a ball mill.

A surface-crosslinking process for a water-absorbent resin, according to the invention, is characterized in that in a process, the pulverization is carried out at a pulverization index of 1,000 or more.

A surface-crosslinking process for a water-absorbent resin, according to the invention, is characterized in that in a process, the surface-crosslinking agent includes a polyhydric alcohol.

A surface-crosslinking process for a water-absorbent resin, according to the invention, is characterized in that in a process, the surface-crosslinking agent includes at least two polyhydric alcohols.

A surface-crosslinking process for a water-absorbent resin, according to the invention, is characterized in that in a process, the resin powder includes a granulation product of a water-absorbent resin before surface-crosslinking.

A surface-crosslinking process for a water-absorbent resin, according to the invention, is characterized in that in a process, the resin powder has a weight-average particle diameter of 300 to 600 μm and a solid content more than 95 weight % before surface-crosslinking.

A surface-crosslinking process for a water-absorbent resin, according to the invention, comprises the step of adding a crosslinking agent to a dry water-absorbent resin powder, thereby crosslinking the neighborhood of its surface, wherein the surface-crosslinking is carried out while the resin powder is pulverized if necessary, and is characterized in that:

the resin powder has a weight-average partides diameter of 300~600 μm before surface-crosslinking;
the resin powder merely has so low absorbency before surface-crosslinking that its absorption capacity for a physiological salt solution under a load is 35 (g/g) or less; and
25 weight % or more of the resin powder comprises coarse partides of 600 to 1,000 μm before surface-crosslinking.

A surface-crosslinking process for a water-absorbent resin, according to the invention, is characterized in that in a process, the surface-crosslinking, which is carried out while the resin powder is pulverized if necessary, reduces the weight-average particle diameter of the resin powder by 1 to 50%.

A dry water-absorbent resin powder, according to the invention, is characterized in that the neighborhood of its surface is crosslinked with at least two polyhydric alcohols having 3 to 8 carbon atoms.

The above constitutions have advantages in that because the water-absorbent resin before being mixed with the surface-crosslinking agent has a large particle diameter and contains only a small quantity of fine particles, it is easy to uniformly mix such a resin with the surface-crosslinking agent, but in that because the pulverization is carried out in the surface-crosslinking step, the water absorption speed is also increased. That is to say, because in the present invention the water-absorbent resin powder is further pulverized after being uniformly mixed with the surface-crosslinking agent, the present invention can stably give a water-absorbent resin having high water absorption speed and high absorption capacity under a load.

The above and other objects and the advantages of the present invention will be more fully apparent from the following detailed disclosure.

DETAILED DESCRIPTION OF THE INVENTION

Figure 1:
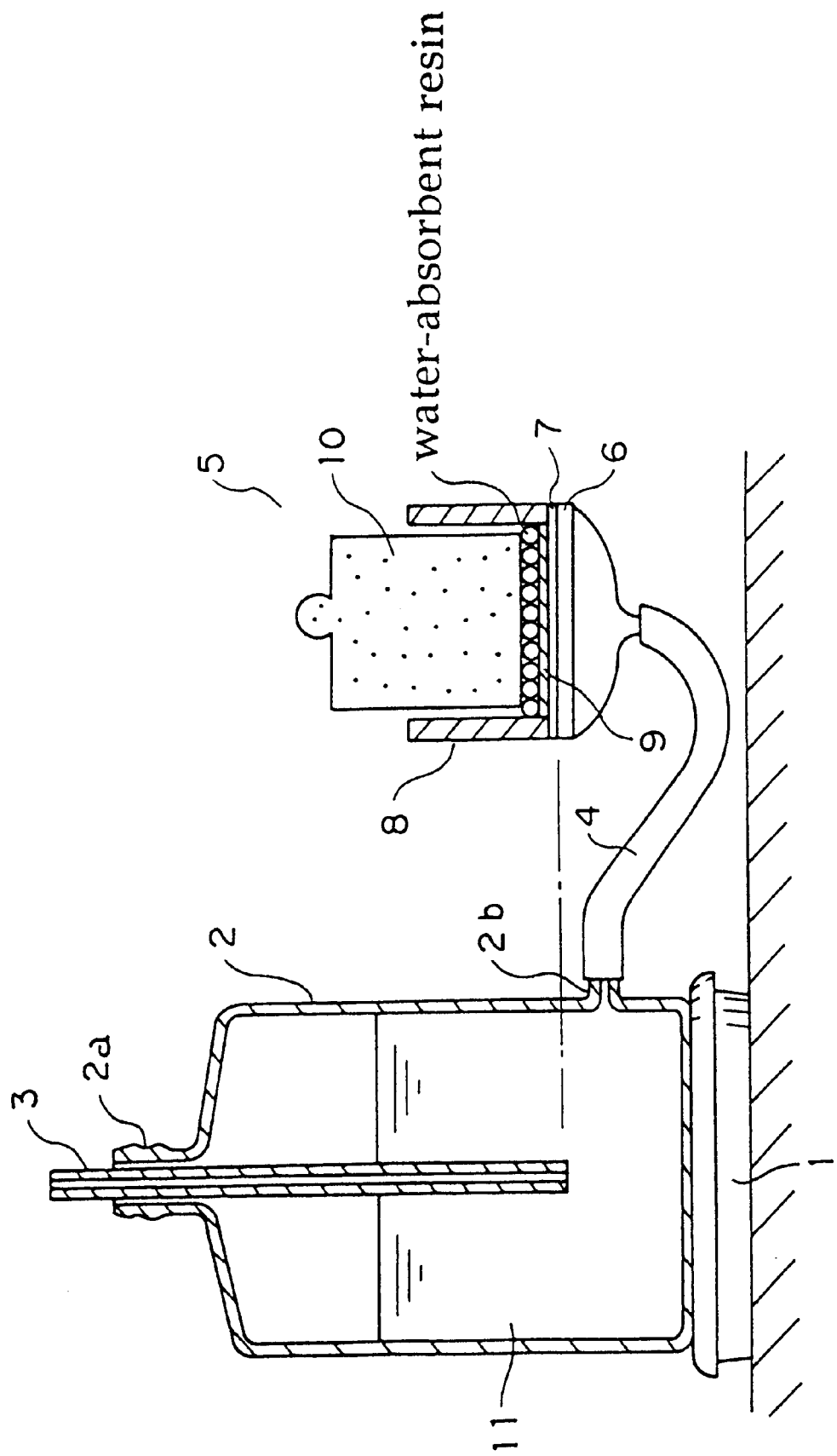
FIG. 1 illustrates an apparatus as used in the present invention for measuring the absorption capacity under a load.
Figure 2:
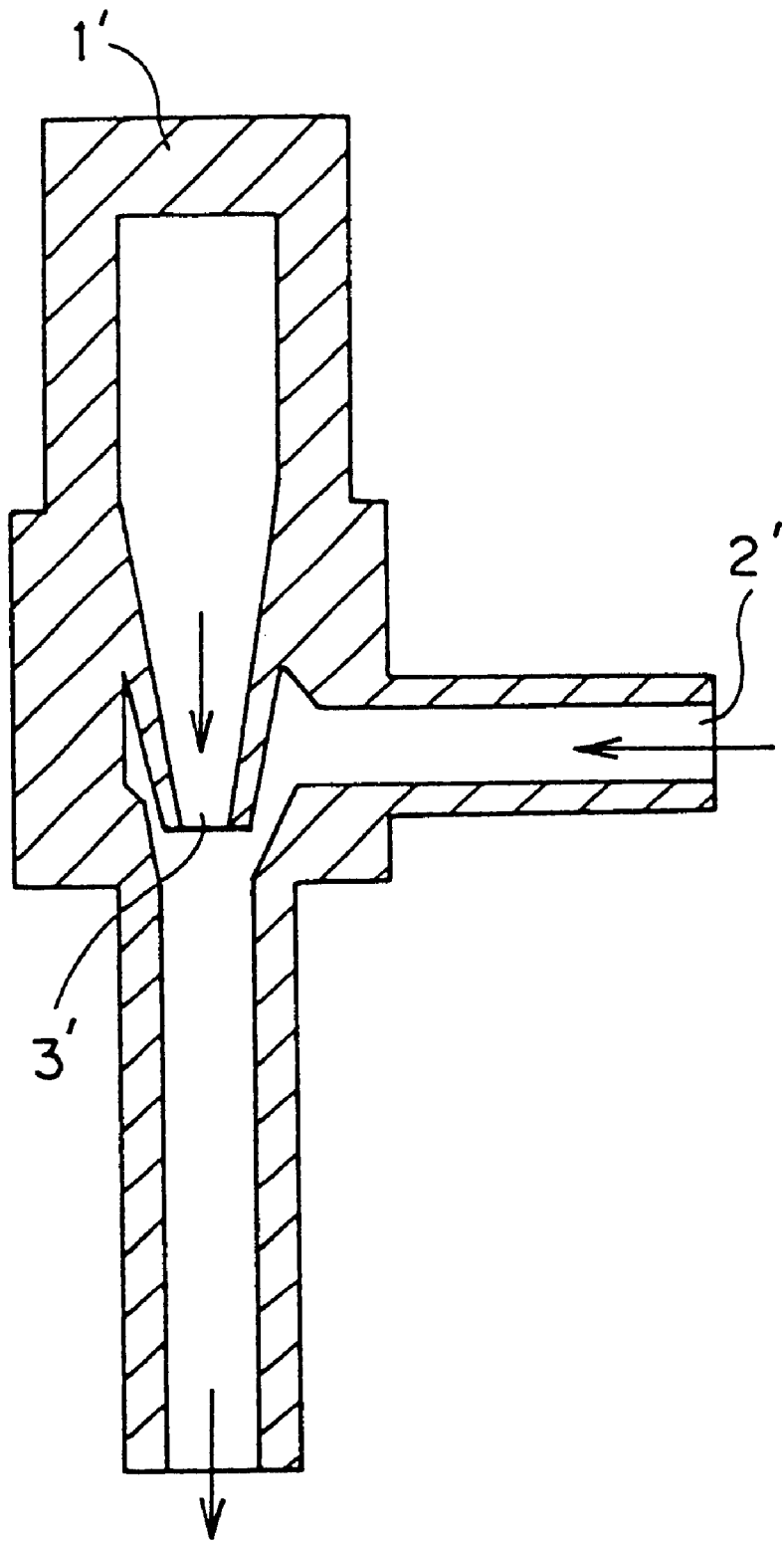
FIG. 2 illustrates a section of the aspirator as used in Production Example 1.

Hereinafter, one mode for carrying out the present invention is explained in detail.

The water-absorbent resin in the present invention is a hydrophilic crosslinked polymer which absorbs a physiological salt solution of 5 or more times the polymer's own weight under no load and thereby swells. Its water absorption capacity (water absorption amount) is preferably 10 or more times, more preferably in the range of 20 to 200 times.

The water-absorbent resin, as used in the present invention, may be a water-absorbent resin as obtained by post-crosslinking a water-soluble polymer, which has not been crosslinked yet, in an aqueous solution, but is preferably a water-absorbent resin as obtained by polymerizing a monomer in an aqueous solution simultaneously with crosslinking. Examples of the monomer as used in such crosslinking polymerization include ring-opening-polymerizable monomers, acid-group-containing unsaturated monomers, nonionic unsaturated monomers, and cationic unsaturated monomers, but in the present invention it is preferable to use acid-group-containing unsaturated monomers (or their salts) and more preferable to use acrylic acid (or its salts) as the essential component of the monomer.

In addition, in the present invention, the water-absorbent resin may be obtained by polymerizing only monomers other than acrylic acid (and other than its salts), or by copolymerizing such other monomers with acrylic acid (or its salts).

The above-mentioned monomers other than acrylic acid (and other than its salts), as used in the present invention, are not especially limited, but their specified examples include at least one unsaturated monomer selected from among the following ones: acid-group-containing unsaturated monomers, such as methacrylic acid, maleic add, crotonic acid, sorbic acid, itaconic acid, cinnamic acid, maleic anhydride, vinyl sulfonic acid, allyl sulfonic acid, vinyltoluene sulfonic acid, styrenesulfonic acid, 2-(meth)acrylamido-2-methylpropanesulfonic acid, 2-(meth)acryloyl ethanesulfonic acid, 2-(meth)acryloyl propanesulfonic acid, and 2-hydroxyethyl(meth)acryloyl phosphate, and their salts; nonionic unsaturated monomers containing a hydrophilic group, such as acrylamide, methacrylamide, N-ethyl(meth)

acrylamide, N,N-dimethyl(meth)acrylamide, 2-hydroxyethyl (meth)acrylate, 2-hydroxypropyl (meth) acrylate, methoxy polyethylene glycol (meth)acrylate, polyethylene glycol mono(meth)acrylate, vinylpyridine, N-vinylpyrrolidone, N-acryloyl piperidine, and N-acryloyl pyrrolidine. Only these monomers other than acrylic acid (and other than its salts) may be polymerized to obtain the water-absorbent resin, but when they are copolymerized with acrylic acid (or its salts), the amount of the monomers other than acrylic acid (and other than its salts) is preferably 50 mol % or below, more preferably 30 mol % or below, of all monomers as used.

In the present invention, when the water-absorbent resin is obtained using the acid-group-containing unsaturated monomer (or its salt) or using its acid-group-containing polymer, the neutralization ratio of the acid group of the resultant water-absorbent resin is adjusted into the range of preferably 30 to 100 mol %, more preferably 60 to 90 mol %, still more preferably 65 to 75 mol %, in view of the water absorption properties, such as water absorption capacity and water absorption speed, and the safety. The neutralization of the acid group may be carried out to the acid-group-containing monomer in its aqueous solution before polymerization, or may be carried out by post-neutralization of an aqueous solution of the polymer of the acid-group-containing monomer, namely, post-neutralization of a polymer gel resultant from the acid-group-containing monomer, or these neutralization methods may jointly be used. In addition, also when the cationic monomer is used, such a monomer or its polymer may be neutralized.

In the present invention, the neutralizing agent as used for the neutralization of the monomer or its polymer is not especially limited, and conventional inorganic or organic bases or acids can be used. Specified examples of the base, used as the neutralizing agent for the acid group, include: sodium hydroxide, potassium hydroxide, lithium hydroxide, ammonium hydroxide, lithium carbonate, sodium carbonate, potassium carbonate, ammonium carbonate, sodium hydrogencarbonate, potassium hydrogencarbonate, ammonium hydrogencarbonate, sodium phosphate, potassium phosphate, ammonium phosphate, sodium borate, potassium borate, ammonium borate, sodium acetate, potassium acetate, ammonium acetate, sodium lactate, potassium lactate, ammonium lactate, sodium propionate, potassium propionate, and ammonium propionate. In addition, examples of the acid, used as the neutralizing agent for the basic group, include acids such as acetic acid, propionic acid, hydrochloric acid, sulfuric acid, and phosphoric acid.

The production of the water-absorbent resin in the present invention may be carried out by forming a water-soluble polymer, which has not been crosslinked yet, and then crosslinking it in an aqueous solution, thus obtaining the water-absorbent resin. However, in view of the resultant properties, it is preferable that the crosslinking is carried out simultaneously with the polymerization of the above unsaturated monomer. As to methods for carrying out the crosslinking during the polymerization, self-crosslinking may be carried out during the polymerization with no internal-crosslinking agent used, but in the present invention it is preferable to use a water-absorbent resin as obtained by carrying out the polymerization in the presence of the internal-crosslinking agent.

The internal-crosslinking agent, as used in the present invention, is a compound which has at least two substituents, copolymerizable and/or reactable with the above unsaturated monomer, per molecule and which is therefore formable into a crosslinking structure, and such an internal-crosslinking agent is used with no especial limitation. Specified examples thereof include: N,N-methylenebis (meth)acrylamide, (poly)ethylene glycol di(meth)acrylate, (poly)propylene glycol di(meth)acrylate, trimethylolpropane tri(meth)acrylate, trimethylolpropane di(meth)acrylate, glycerol tri(meth)acrylate, glycerol acrylate methacrylate, ethylene-oxide-denatured trimethylolpropane tri(meth) acrylate, pentaerythritol tetra(meth)acrylate, dipentaerythritol hexa(meth)acrylate, triallyl cyanurate, triallyl isocyanurate, triallyl phosphate, triallylamine, poly(meth) allyloxyalkanes, (poly)ethylene glycol diglycidyl ether, glycerol diglycidyl ether, ethylene glycol, polyethylene glycol, propylene glycol, glycerol, pentaerythritol, ethylenediamine, polyethylenimine, glycidyl (meth) acrylate, acetals (e.g. tetraallyloxyethane), ethers (e.g. pentaerythritol tetraallyl ether, pentaerythritol triallyl ether, pentaerythritol diallyl ether, trimethylolpropane triallyl ether, trimethylolpropane diallyl ether, ethylene glycol diallyl ether, diethylene glycol diallyl ether, triethylene glycol diallyl ether, polyallyl ethers as derived from compounds having two or more hydroxyl groups per molecule such as monosaccharides, disaccharides, polysaccharides, and cellulose), triallyl isocyanurate, and triallyl cyanurate. However, the internal-crosslinking agent is not especially limited. In the present invention, among the above-exemplified internal-crosslinking agents, those which have at least two polymerizable unsaturated groups per molecule are preferable because the use of such internal-crosslinking agents can further improve the absorption properties of the resultant water-absorbent resin.

The above internal-crosslinking agents are used either alone respectively or in combinations with each other during the polymerization and may be added either all at once or divisionally. In addition, the amount of the internal-crosslinking agent depends on the kind of this agent or on the aimed crosslinking density, but is in the range of preferably 0.005 to 3 mol %, more preferably 0.01 to 1.5 mol %, still more preferably 0.05 to 1 mol %, yet still more preferably 0.06 to 0.5 mol %, of the above monomer component. When the amount deviates from these ranges, no water-absorbent resin having the desired absorption properties might be obtained.

The method for polymerizing the above monomer is not especially limited, and conventional methods such as aqueous solution polymerization, reversed-phase suspension polymerization, bulk polymerization and precipitation polymerization can be employed. Particularly, methods in which the monomer component is polymerized in its aqueous solution, namely, aqueous solution polymerization and reversed-phase suspension polymerization, are preferable for the easiness of the control of the polymerization reaction and for the performance of the resultant water-absorbent resin. Incidentally, such aqueous solution polymerization or reversed-phase suspension polymerization is, for example, described in U.S. Pat. No. 4,625,001, U.S. Pat. No. 4,769, 427, U.S. Pat. No. 4,873,299, U.S. Pat. No. 4,093,776, U.S. Pat. No. 4,367,323, U.S. Pat. No. 4,446,261, U.S. Pat. No. 4,683,274, U.S. Pat. No. 4,690,996, U.S. Pat. No. 4,721,647, U.S. Pat. No. 4,738,867, and U.S. Pat. No. 4,748,076.

In the present invention, when the monomer is polymerized in its aqueous solution, its monomer concentration is in the range of preferably 5 to 70 weight %, more preferably 10 to 50 weight %, most preferably 15 to 40 weight %. When the concentration is too high or too low, the effects of the present invention might hardly be displayed.

In addition, the reaction conditions such as reaction temperature and reaction time may fitly be set according to factors such as composition of the monomer as used, and are not especially limited. However, the polymerization is carried out in the temperature range of usually 10 to 110° C., preferably 15 to 90° C. Incidentally, when the polymerization is carried out, the following materials may further be added: hydrophilic polymers, such as starch or its derivatives, cellulose or its derivatives, polyvinyl alcohol, polyacrylic add (or its salts), and crosslinked matters of polyacrylic acid (or its salts); chain transfer agents, such as hypophosphorous acid (or its salts); and foaming agents, such as inert gases and carbonate salts as mentioned below.

In addition, the polymerization may be initiated, for example, using radical polymerization initiators, such as potassium persulfate, ammonium persulfate, sodium persulfate, t-butyl hydroperoxide, hydrogen peroxide, and 2,2'-azobis(2-amidinopropane) dihydrochloride, or active energy rays, such as ultraviolet rays and electron beam. In addition, when oxidizable radical polymerization initiators are used, redox polymerization may be carried out using reductants, such as sodium sulfite, sodium hydrogensulfite, ferrous sulfate, and L-ascorbic acid, jointly with the oxidizable radical polymerization initiators. The amount of the above polymerization initiator, as used, is in the range of preferably 0.001 to 2 mol %, more preferably 0.01 to 0.5 mol %. In addition, it is preferable that the polymerization initiator is added in the form of its solution or dispersion using solvents such as water.

In the present invention, the hydrogel polymer as obtained in the above way needs to be dried (if necessary, the resultant dry hydrogel polymer may be further pulverized and classified) to form it into a water-absorbent resin powder before addition of the surface-crosslinking agent. In the case where the surface-crossing agent is added to a non-powdery water-absorbent resin (e.g. hydrogel of the resin), even if the pulverization according to the present invention is carried out after the addition of the surface-crosslinking agent or during the reaction with the surface-crosslinking agent, the aimed water-absorbing agent with excellent absorption capacity under a load and water absorption speed cannot be obtained.

Thus, as to the drying as needs to be carried out before the addition of the surface-crosslinking agent, the drying temperature is not especially limited, but is, for example, in the range of preferably 100 to 250° C., more preferably 120 to 200° C. In addition, the drying time is not especially limited, but is preferably in the range of about 10 seconds to about 5 hours. Incidentally, before being dried, the hydrogel polymer may be neutralized or disintegrated into fine pieces.

As to the drying method, the following various methods can be employed: heat drying; hot-air drying; drying under vacuum; infrared drying; microwave drying; drum drier drying; dehydration by azeotropy with hydrophobic organic solvents; and high-moisture drying by high temperature steaming. Thus, the drying method is not especially limited.

In the present invention, the neighborhood of the surface of the water-absorbent resin powder as obtained in the above way is crosslinked.

In the present invention, it is preferable that the water-absorbent resin powder, as used for surface-crosslinking, comprises particles having a maximum particle diameter of substantially 1,000 $\mu$m and a weight-average particle diameter of usually 200 to 1,000 $\mu$m, preferably 300 to 600 $\mu$m, more preferably 400 to 500 $\mu$m, and, particularly, contains only a small quantity of fine particles of 150 $\mu$m or below, of which the content is, for example, 10 weight % or below, preferably 5 weight % or below, more preferably 1 weight % or below, particularly preferably, substantially zero. In the case where the quantity of the fine particles is large, the granulation tends to occur and therefore the pulverization as referred to in the present invention is not made and further, the properties are hardly improved. That is to say, the present invention is characterized in that uniform surface-crosslinking is achieved by reducing the content of fine particles before surface-crosslinking, and further in that the water absorption speed is raised by carrying out pulverization during surface-crosslinking.

In addition, the solid content of the water-absorbent resin powder, as used in the present invention, is preferably above 85 weight %, more preferably above 90 weight %, still more preferably above 95 weight %, for the purpose of achieving uniform pulverization during surface-crosslinking. In the case where the water content is high, uniform and efficient pulverization might not be made, and further the miscibility of the surface-crosslinking agent deteriorates. Especially, even if the powder is replaced with hydrogels (as are, for example, disclosed in EP 509708 and U.S. Pat. Nos. 5,633, 316 and 5,145,906), specifically, even if the present invention process is applied to hydrogel polymers having a water content of 15 weight % or more, or 15 to 90 weight %, particularly 30 to 45 weight %, the effects of the present invention cannot sufficiently be achieved. Furthermore, the particle shape of the resin powder is, preferably, irregular pulverized shape as regulated to a predetermined particle size by the pulverization step after drying. In addition, like in the case of the process as set forth in U.S. Pat. No. 5,385,983, if the particle diameter is not beforehand regulated, the object of the present invention cannot be achieved.

The present invention is further characterized in that: for stably carrying out surface-crosslinking, especially, for improving the liquid-permeability under a load, it is preferable that the absorption capacity under no load of the water-absorbent resin powder is as low as possible before surface-crosslinking, specifically, it is preferable that, before being surface-crosslinked, the resin powder merely has so low absorbency that its absorption capacity for a physiological salt solution is usually 50 (g/g) or less, preferably 35 (g/g) or less. It is natural that it is conventionally preferable that the absorption capacity of the water-absorbent resin is high. However, the present inventors have found that, surprisingly, it is preferable that the absorption capacity is as low as possible, particularly, 35 (g/g) or less, before surface-crosslinking. The present inventors have further found that: in the case where the absorption capacity is high before surface-crosslinking in the present invention, it is difficult to stably obtain a water-absorbing agent having the aimed properties, or the surface-crosslinking is non-uniformly made, or the absorption capacity under a load or the liquid-permeability under a load deteriorates. Thus, a water-absorbent resin powder, having a low absorbency of preferably 35 (g/g) or below, more preferably 33 to 27 (g/g), before surface-crosslinking, is favorably used.

The water content or particle diameter of the water-absorbent resin powder is as above, but any of (a) a porous powder, (b) a coarse powder with a certain particle size, and (c) granular particles is preferably used as the water-absorbent resin powder.

That is to say, the present invention provides a surface-crosslinking process for a water-absorbent resin, which comprises the step of adding a crosslinking agent to a dry water-absorbent resin powder, thereby crosslinking the neighborhood of its surface and is characterized in that the surface-crosslinking is carried out while the resin powder having a weight-average particle diameter of 200 to 1,000 µm is pulverized. For the purpose of efficiently carrying out the pulverization during surface-crosslinking, it is preferable that the water-absorbent resin, as used, is porous (powder (a) above). Such a porous water-absorbent resin is preferable, because it can stably and efficiently be pulverized using a specific apparatus as equipped with the below-mentioned specific or greater mechanical force during surface-crosslinking or with pulverization functions, starting from pores or folds of the porous water-absorbent resin powder.

The porous water-absorbent resin, as preferably used in the present invention, is obtainable by foaming a water-absorbent resin in at least one step selected from the polymerization step, the crosslinking step, and the below-mentioned drying step. Preferably, the porous water-absorbent resin is obtainable by foaming-polymenzation in the polymerization step.

Hereinafter, the production process for the porous water-absorbent resin (powder (a) above) as preferably used in the present invention is further mentioned.

As to a foaming process to obtain the porous water-absorbent resin preferable in the present invention, the aqueous solution polymerization in the present invention is preferably carried out in a state where foams are dispersed in an aqueous monomer solution as disclosed in the specification of European Patent Application No. 97306427.2. In such a case, the volume of the aqueous monomer solution in which the foams are dispersed is usually 1.02 or more times, preferably 1.08 or more times, more preferably 1.11 or more times, most preferably 1.2 or more times, of that in a state where no foam is dispersed Some foams might mingle in polymerization reaction operations under stirring as conventionally carried out, but the present inventors confirmed that even if foams mingled in conventional operations, the resultant change of volume would be merely less than 1.01 times. The change of volume to 1.02 or more times is a result of carrying out an operation of intentionally mingling foams, and it is seen that such an operation improves the performance of the resultant resin to give the porous water-absorbent resin favorable for the present invention. Incidentally, because the volume change of the aqueous monomer solution in a reaction vessel is measured by changes in the height of the draft line, the ratio of the volume change can easily be confirmed. As a result of the operation of intentionally mingling foams, the transparency of the aqueous monomer solution falls and the aqueous monomer solution becomes white, so the state of the aqueous monomer solution where foams are dispersed can be confirmed with the naked eye as well.

In addition, a preferable foaming process to obtain the porous water-absorbent resin in the present invention is a production process in which the aqueous monomer solution and a gas are mixed together by fluid-mixing to disperse foams into the aqueous monomer solution, thus obtaining an aqueous monomer solution where foams are dispersed, and then the monomer is polymerized in such a foam dispersion state.

One of the processes to obtain the porous water-absorbent resin in the present invention is a process in which the aqueous monomer solution and a gas are fluid-mixed together. The aqueous monomer solution and the gas fall into a fluid state, for example, by jetting them from a nozzle or aspirating them. Mixing both in a fluid state enables the gas to uniformly stably be dispersed into the aqueous monomer solution. In addition, polymerizing the monomer in the state where the gas is beforehand dispersed in the aqueous monomer solution enables easy control of the pore diameter and can give the porous water-absorbent resin having fast absorption speed.

The fluid-mixing process is, for example, a process in which a fluid of either one of the aqueous monomer solution and the gas is sprayed from a nozzle into a fluid of the other, thereby mixing them together. Specified examples of such a process include: a process in which the gas is run from a nozzle in a parallel current to a fluid of the aqueous monomer solution as jetted from another nozzle, thereby mixing them together; and a process in which the aqueous monomer solution is run from a nozzle in a parallel current to a fluid of the gas as jetted from another nozzle, thereby mixing them together. In addition, it is also permissible that the gas is blown directly into the fluid of the aqueous monomer solution. When the fluid-mixing is carried out, both can be sprayed in parallel currents, countercurrents, or perpendicular currents to each other. Particularly, parallel currents are preferable. Spraying in parallel currents can uniformly disperse foams. Spraying in countercurrents might attach flying foams to walls and so on and thereby cause polymerization. Examples of apparatuses for fluid-mixing include aspirators and ejectors.

In the present invention, for the purpose of obtaining the porous water-absorbent resin, it is preferable that the polymerization reaction is carried out in the presence of a surface-active agent. The use of the surface-active agent enables stable dispersion of the foams. In addition, if the kind or quantity of the surface-active agent is fitly controlled, it is possible to control the pore diameter and the water absorption speed of the resultant water-absorbent resin. Examples of such a surface-active agent include anionic ones, nonionic ones, cationic ones, and amphoteric ones.

Examples of the anionic surface-active agent, as used, include: fatty acid salts such as sodium mixed-fatty acid salt soap, half-cured sodium tallow fatty add salt soap, sodium stearate soap, potassium oleate soap, and potassium castor oil soap; alkylsulfuric add ester salts such as sodium laurylsulfate, sodium higher alcohol sulfate, and triethanolaminelaurylsulfate; alkylbenzenesulfonic acid salts such as sodium dodecylbenzenesulfonate; alkylnaphthalenesulfonic acid salts such as sodium alkylnaphthalenesulfonates; alkylsulfosuccinic acid salts such as sodium dialkylsulfosuccinates; alkyl diphenyl ether disulfonic acid salts such as sodium alkyl diphenyl ether disulfonates; alkylphosphoric acid salts such as potassium alkylphosphates; polyoxyethylene alkyl(or alkylallyl)sulfuric acid ester salts such as sodium polyoxyethylene lauryl ether sulfate, sodium polyoxyethylene alkyl ether sulfate, triethanolamine polyoxyethylene alkyl ether sulfate, and sodium polyoxyethylene alkyl phenyl ether sulfate; special reaction type anionic surface-active agents; special carboxylic acid type surface-active agents; naphthalenesulfonic acid-formalin condensation products such as sodium salts of P-naphthalenesulfonic acid-formalin condensation products and sodium salts of special aromatic sulfonic acid-formalin condensation products; special polycarboxylic acid type polymer surface-active agents; and polyoxyethylene alkylphosphoric acid esters.

Examples of the nonionic surface-active agent, as used, include: polyoxyethylene alkyl ethers such as polyoxyethylene lauryl ether, polyoxyethylene cetyl ether, polyoxyethylene stearyl ether, polyoxyethylene oleyl ether, and polyoxyethylene higher alcohol ether; polyoxyethylene alkyl aryl ethers such as polyoxyethylene nonyl phenyl ether; polyoxyethylene derivatives; sorbitan fatty acid esters such as sorbitan monolaurate, sorbitan monopalmitate, sorbitan monostearate, sorbitan tristearate, sorbitan monooleate, sorbitan trioleate, sorbitan sesquioleate, and sorbitan distearate; polyoxyethylene sorbitan fatty acid esters such as polyoxyethylene sorbitan monolaurate, polyoxyethylene sorbitan monopalmitate, polyoxyethylene sorbitan monostearate, polyoxyethylene sorbitan tristearate, polyoxyethylene sorbitan monooleate, and polyoxyethylene sorbitan trioleate; polyoxyethylene sorbitol fatty acid esters such as polyoxyethylene sorbitol tetraoleate; glycerol fatty acid esters such as glycerol monostearate, glycerol monooleate, and self-emulsifying type glycerol monostearate; polyoxyethylene fatty acid esters such as polyoxyethylene glycol monolaurate, polyoxyethylene glycol monostearate, polyoxyethylene glycol distearate, and polyoxyethylene glycol monooleate; polyoxyethylene alkylamines; polyoxyethylene cured castor oil; and alkylalkanolarnides.

Examples of the cationic and amphoteric surface-active agents, as used, include: alkylamine salts such as coconut amineacetate and stearylamineacetate; quaternary ammonium salts such as lauryltrimethylammonium chloride, stearyltrimethylammonium chloride, cetyltrimethylammonium chloride, distearyldim ethylammonium chloride, and alkylbenzyldimethylammonium chloride; alkylbetaines such as laurylbetaine, stearylbetaine, laurylcarboxymethyl-hydroxyethyl imidazoliniumbetaine; and amine oxides such as lauryldimethylamine oxide. In addition, the use of such a cationic surface-active agent can give antibacterial property to the resultant water-absorbent resin.

Furthermore, fluorosurface-active agents are also available. The use of the fluorine surface-active agent enables stable dispersion of foams of inert gases in the aqueous monomer solution for a long time, and further enables easy control of the amount of foams and the pore diameter, and gives a porous foamed matter of the water-absorbent resin, and accelerates the absorption speed, and further can afford antibacterial property to the resultant water-absorbent resin. A variety of fluorosurface-active agents are usable in the present invention, but an example thereof is obtainable by substituting fluorine for hydrogen of a lipophilic group of common surface-active agents to convert this lipophilic group into a perfluoroalkyl group. Such an example of the fluorosurface-active agent displays greatly strengthened surface-activity.

The surface-active agent, as used in the present invention, is not limited to the above-exemplified ones.

The amount of the surface-active agent, as used, is in the range of usually 0.0001 to 10 weight parts, preferably 0.0003 to 5 weight parts, per 100 weight parts of the water-soluble ethylenically unsaturated monomer as used. That is to say, in the case where the amount of the surface-active agent is smaller than 0.0001 weight part, the dispersion of the gas might be insufficient. On the other hand, the amount of the surface-active agent exceeding 10 weight parts might be uneconomical in that no effect rewarding such an amount might not be obtained.

Conventionally, it is known to use a surface-active agent in aqueous solution polymerization. However, such conventional arts cannot improve the water absorption speed at all. In the present invention, it is preferable to polymerize the monomer in a foam-dispersed state. Examples of the gas as fluid-mixed with the aqueous monomer solution include inert gases such as nitrogen, argon, helium, and carbonic add gas. If a gas containing oxygen is mixed, water-absorbent resins with various molecular weights can be obtained by fitly controlling the ratio between oxygen and a sulfite such as sodium hydrogensulfite as used for the polymerization initiator. In addition, when an oxidant is used as the polymerization initiator, the polymerization can be initiated by miidng sulfurous acid gas.

The viscosity of the aqueous monomer solution is not especially limited, but the adjustment of the viscosity to 10 cP or more enables more stable dispersion of the foams. The viscosity is in the range of preferably 10 to 100,000 cP, more preferably 20 to 3,000 cP. The adjustment of the viscosity to 10 cP or more enables stable dispersion of the foams in the aqueous monomer solution for a long time. Incidentally, in the case where the viscosity is higher than 100,000 cP, the foams in the aqueous monomer solution might be so large that it is difficult to obtain the water-absorbent resin having high water absorption speed.

In the present invention, a thickener may be added to the aqueous monomer solution if necessary. The thickener has only to be a hydrophilic polymer, and examples of usable thickeners include: polyacrylic acid (or its salts), polyvinyl alcohol, polyvinylpyrrolidone, polyacrylamide, polyethylene oxide, hydroxyethyl cellulose, carboxymethyl cellulose, and hydroxypropyl cellulose. Colloidal silica or water-absorbent resins such as crosslinked matters of polyacrylic acid (or its salts) can be used as the thickener. These hydrophilic polymers, utilized as the thickener, have an average molecular weight of preferably 10,000 or above, more preferably 100,000 or above. In the case where the average molecular weight is less than 10,000, a large amount of thickener must be added, so the water absorbency might unfavorably deteriorate. In addition, the amount of the thickener, as added, is not especially limited if it increases the viscosity of the aqueous monomer solution to 10 cP or more, but the amount is in the range of generally 0.01 to 10 weight %, preferably 0.1 to 5 weight %, of the above monomer. In the case where the amount of the thickener, as added, is smaller than 0.01 weight %, the viscosity might not reach 10 cP or more, and in the case where the amount exceeds 10 weight %, the water absorbency might deteriorate.

Next, the resultant hydrogel containing foams is finely cut if necessary, and then dried, and the resultant dry product is pulverized to give a powdery water-absorbent resin having fast water-absorption or dissolution speed.

The porous water-absorbent resin is obtainable by the above process, but may be obtained by another foaming polymerization. Examples of the foaming agent, as used, include: carbonates such as sodium carbonate, potassium carbonate, ammonium carbonate, magnesium carbonate, calcium carbonate, sodium hydrogencarbonate, potassium hydrogencarbonate, ammonium hydrogencarbonate, magnesium hydrogencarbonate, calcium hydrogencarbonate, zinc carbonate, and barium carbonate; water-soluble azo polymerization initiators such as azobisamidinopropane dihydrochloride; dicarboxylic acids such as malonic acid; and volatile organic solvents such as trichloroethane and trifluoroethane. When the foaming agent is added, its proper amount is in the range of usually 0 to 5 weight parts, more preferably 0 to 1 weight part, per 100 weight parts of the total of the water-soluble unsaturated monomer and the water-soluble crosslinkable monomer.

The hydrogel polymer, obtained by the above foaming polymerization, is disintegrated into pieces of about 0.1 to about 50 mm by a predetermined method during or after the reaction if necessary. Next, for the purpose of making foams more efficiently, the above hydrogel polymer containing foams is dried. Incidentally, it is also permissible that the foaming with the foaming agent is carried out not during the reaction, but during the drying.

In the present invention, the hydrogel polymer as obtained in the above way needs to be dried (if necessary, the resultant dry hydrogel polymer may be further pulverized) to form it into a water-absorbent resin powder before addition of the surface-crosslinking agent. The usable drying method is as above, and is not especially limited. The hot-air drying and the microwave drying are preferable among the above-exemplified drying methods. If microwave are transmitted into the foam-containing hydrogel, the foams swell to several times up to some tens of times, so that a water-absorbent resin which displays more improved water absorption speed can also be obtained.

When the microwave drying is carried out on the hydrogel polymer containing foams, the thickness of the above-integrated hydrogel is preferably 3 mm or above, more preferably 5 mm or above, still more preferably 10 mm or above. In addition, when the microwave drying is carried out on the hydrogel, it is particularly preferable that the hydrogel is formed into a sheet having the above thickness.

The porous water-absorbent resin according to the present invention is obtainable at a low cost and easily by the above polymerization, that is, the above production process. The average pore diameter of the above water-absorbent resin is in the range of usually 10 to 500 μm, preferably 20 to 400 μm, more preferably 30 to 300 μm, most preferably 40 to 200 μm. The above average pore diameter is determined by carrying out image analysis of sections of the dried water-absorbent resin with an electron microscope. That is to say, a histogram showing the distribution of the pore diameters of the water-absorbent resin is made by carrying out the image analysis, and the number average of the pore diameters is calculated from the above histogram, whereby the average pore diameter can be determined.

With regard to the water-absorbent resin, preferably, the porous one, as obtained in the above way, it is preferable that the specific bulk gravity is smaller than conventional ones, specifically, is in the range of 0.6 to 0.1 g/cc, more preferably 0.5 to 0.2 g/cc, and that the BET specific surface area is larger than conventional ones, that is to say, is 0.025 m$^2$/g or above, more preferably 0.03 m$^2$/g or above, still more preferably 0.04 m$^2$/g or above. If a powder of such a water-absorbent resin is pulverized simultaneously with its surface-crosslinking, the object of the present invention can be better achieved.

In the present invention, it is also permissible to use and pulverize a water-absorbent resin powder with a certain particle size (powder (b) above) besides the above porous water-absorbent resin powder (powder (a) above) simultaneously with surface-crosslinking of the neighborhood of the surface.

In the case where the above porous water-absorbent resin is not used, for example, in the case where a water-absorbent resin powder with a specific bulk gravity of 0.6 to 0.7 (but not including 0.7) is used, as to the particle size of the usable water-absorbent resin powder, it is favorable that the content of particles with a particle diameter of 150 μm or greater in the resin is usually at least 90 weight %, preferably at least 95 weight %, more preferably at least 98 weight %, and it is more favorable that the content of particles with a particle diameter of 600 μm or greater in the resin is usually at least 20 weight %, preferably at least 25 weight %, more preferably 25 to 50 weight %. As to the favorable particle size of the above resin, the content of particles with a particle diameter of 1,000 μm (as the substantial upper limit) in the resin is preferably 5 weight % or less, and the content of particles with a particle diameter of 300 μm or greater in the resin is preferably in the range of 70 to 99 weight %. If the neighborhood of the surface of such coarse particles with the above specific particle size including the above particles of 150 μm or greater, 300 μm or greater, and 600 μm or greater, respectively, is crosslinked while these particles are pulverized, then a water-absorbing agent is stably obtainable, which agent contains only a small quantity of fine particles and is excellent with regard to the water absorption speed, the absorption capacity under a load, and the liquid-permeability under a load, and further the impact resistance. In the case where the particle size deviates from the above range, the pulverization as referred to in the present invention is difficult to carry out.

In the present invention, furthermore, it is also permissible to use granular particles (particles (c) above) besides the porous powder (powder (a) above) and besides the coarse powder with a certain particle size (powder (b) above). If the content of fine particles in the water-absorbent resin powder (the neighborhood of its surface is to be crosslinked) is beforehand decreased by the use of either one or preferably both of powder (b) and particles (c), and if the resin powder is thereafter pulverized simultaneously with surface-crosslinking, then the following effects can be enhanced: 1) uniform surface-crosslinking because the fine particle content is low when the surface-crosslinking agent is mixed; 2) high water absorption speed due to pulverization as carried out during surface-crosslinking; and 3) impact resistance in a dry state of the water-absorbing agent resultant from surface-crosslinking. The present invention can achieve the low content of fine particles, the excellent liquid-permeability under a load, the high absorption capacity under a load, and the high absorption speed by beforehand granulating the resin powder to decrease the content of fine particles therein before surface-crosslinking and further by fracturing at least part of the resultant granular particles.

In the present invention, in the case where the granular particles are used, it is preferable that the water-absorbent resin powder is granulated into a certain particle size using water. The granulation may be carried out during the polymerization or in drying of the water-absorbent resin, or carried out to a dried powder, preferably, fine particles (e.g. particles of 150 μm or below). In view of the resultant properties, it is preferable to remove only the fine particles from the powder by means such as classification and to separately granulate the removed fine particles.

In the present invention, the method to obtain the granular particles using aqueous liquids is not especially limited, but examples thereof include tumbling granulation methods, compression type granulation methods, stirring type granulation methods, extrusion granulation methods, pulverization type granulation methods, fluidized-bed granulation methods, and spray drying granulation methods.

Granular particles preferable for the granulation strength are those which are obtainable by using water or aqueous liquids and further drying the granulation products. Granular particles (c) are preferable because at least part thereof can efficiently be fractured during surface-crosslinking similarly to powders (a) and (b) above. The amount of water, usable for granulation of fine particles, is in the range of usually 2 to 300 weight parts, preferably 30 to 250 weight parts, more preferably 70 to 200 weight parts, still more preferably 100 to 200 weight parts, per 100 weight parts of water-absorbent resin, and it is preferable to use granular particles as obtained by adding such an amount of water to the fine particles and, if necessary, further drying and pulverizing the resultant granulation product. The amount of water deviating from the above range tends to provide inferior results with regard to the absorption capacity under a load or the liquid-permeability under a load.

In the granulation step (in which the above aqueous liquid is mixed with the powder) in the present invention, the procedure is preferably carried out for the purpose of further improving the granulation strength or the water absorption capacity under a load as follows: the aqueous liquid is heated and preferably kept in the range of from 50° C. to its boiling point prior to granulation, and more preferably the powder is also heated to 40° C. or higher, still more preferably 50 to 100° C., prior to granulation, and thereafter the aqueous liquid and the powder are mixed. In addition, in the granulation step, it is preferable to mix the heated aqueous liquid and the heated fine particles at high speed over a period of preferably 3 minutes or shorter, more preferably 1 minute or shorter, most preferably 1 to 60 seconds. In the case where the mixing duration is long, uniform mixing is difficult, and a vast aggregate is therefore formed, and further, the water-soluble content increases, or the water absorption capacity under a load deteriorates. Thereafter, the resultant granulation product, particularly, hydrogel granulation product, is essentially dried and, if necessary, pulverized and classified, thus obtaining a water-absorbent resin powder. The temperature or method for drying subsequent to the mixing of the aqueous liquid, and further the particle size or water content of the dried powder, are the same as those aforementioned.

In the case where the above granulation product is used in the present invention, this granulation product may be used alone, but in the case where a mixture of primary particles and granular particles of the water-absorbent resin is subjected to the crosslinking treatment of the neighborhood of the surface while being pulverized, the weight ratio of the primary particles to the granular partidles is in the range of preferably 50/50 to 99/1, more preferably 60/40 to 98/2, still more preferably 70/30 to 95/5. In these ranges, a water-absorbing agent excellent in the water absorption capacity under a load or the impact resistance is obtainable by beforehand making granulation of lessen the content of fine particles and by thereafter carrying out the surface-crosslinking simultaneously with the pulverization.

As is explained above, the above (a) porous powder, (b) coarse powder with a certain particle size, and (c) granular powder are preferably used, but other powders are also fitly available.

As is mentioned above, the present invention surface-crosslinking process for a water-absorbent resin is characterized in that in a process comprising the step of adding a crosslinking agent to a dry water-absorbent resin powder to thereby crosslink the neighborhood of its surface, the surface-crosslinking is carried out while the water-absorbent resin powder having a weight-average particle diameter of 200 to 1,000 μm is pulverized. Hereinafter, this surface-crosslinking process for a water-absorbent resin is further explained.

Conventionally, there is also a known process in which a plurality of water-absorbent resins are bound to each other during their surface-crosslinking, thereby carrying out the granulation of water-absorbent resin particles simultaneously with their surface-crosslinking (WO 91/17200 and Publication of Internal Patent Application as entered the national phase in Japan (Kohyo) No. 06-216042). In addition, there is also a known art in which the particle size is kept constant during surface-crosslinking (all examples of preferred embodiments as set forth in JP-A-58-042602). Furthermore, there is also a known art in which a foamed water-absorbent resin is surface-crosslinked (Publication of Internal Patent Application as entered the national phase in Japan (Kohyo) No. 08-509521, and JP-A-05-237378, JP-A-63-088410, WO 96/17884). In addition, separately, it is also known that the surface fracture due to mechanical stress to the surface-crosslinked water-absorbent resin is a problem (EP 812873).

However, in the present invention, it has been found that a water-absorbent resin, which satisfies both the water absorption speed and the absorption capacity under a load, is obtainable by surface-crosslinking a water-absorbent resin powder while the resin powder is pulverized by daring to apply certain or greater mechanical stress to the resin powder until the resin powder becomes pulverized, contrary to the conventional common sense that the application of mechanical stress to a water-absorbent resin gives bad influence to the resin. In addition, in view of the pulverization efficiency or the resultant properties, the aforementioned (a) porous powder, (b) coarse particles with a certain particle size, or (c) granular particles are preferable as the not yet surface-crosslinked water-absorbent resin to be pulverized. The surface-crosslinking by pulverization of (a) the porous foamed matter can give a water-absorbing agent which satisfies both the water absorption speed and the absorption capacity under a load, and further, the surface-crosslinking by pulverization of (b) the coarse particles can give a water-absorbing agent which is excellent with regard to the absorption capacity under a load, the liquid-permeability under a load, and the impact resistance.

Specified examples of the surface-crosslinking agent, usable in the present invention, include: polyhydric alcohol compounds such as ethylene glycol, diethylene glycol, propylene glycol, triethylene glycol, tetraethylene glycol, polyethylene glycol, 1,3-propanediol, dipropylene glycol, 2,2,4-trimethyl-1,3-pentanediol, polypropylene glycol, glycerol, polyglycerol, 2-butene-1,4-diol, 1,4-butanediol, 1,3-butanediol, 1,5-pentanediol, 1,6-hexanediol, 1,2-cyclohexanedimethanol, 1,2-cyclohexanol, trimethylolpropane, diethanolamine, triethanolamine, polyoxypropylene, oxyethylene-oxypropylene block copolymer, pentaerythritol and sorbitol; epoxy compounds such as ethylene glycol diglycidyl ether, polyethylene glycol diglycidyl ether, glycerol polyglycidyl ether, diglycerol polyglycidyl ether, polyglycerol polyglycidyl ether, propylene glycol diglycidyl ether, polypropylene glycol diglycidyl ether and glycidol; polyamine compounds, such as ethylenediamine, diethylenetriamine, triethylenetetraamine, tetraethylenepentaamine, pentaethylenetetraamine, polyethylenimine, and polyamidepolyamine; haloepoxy compounds, such as epichlorohydrin, epibromohydrin and α-methylepichlorohydrin; condensation products from the above polyamine compounds and the above haloepoxy compounds; polyisocyanate compounds such as 2,4-tolylene diisocyanate and hexamethylene diisocyanate; polyoxazoline compounds such as 1,2-ethylenebisoxazoline; silane coupling agents such as γ-glycidoxypropyltrimethoxysilane and γ-aminopropyltrimethoxysilane; and alkylene carbonate compounds such as 1,3-dioxolan-2-one, 4-methyl-1,3-dioxolan-2-one, 4,5-dimethyl-1,3-dioxolan-2-one, 4,4-dimethyl-1,3-dioxolan-2-one, 4-ethyl-1,3-dioxolan-2-one, 4-hydroxymethyl-1,3-dioxolan-2-one, 1,3-dioxan-2-one, 4-methyl-1,3-dioxan-2-one, 4,6-dimethyl-1,3-dioxan-2-one and 1,3-dioxopan-2-one. However, the surface-crosslinking agent is not especially limited.

Preferable ones among the above-exemplified surface-crosslinking agents are as follows: polyhydric alcohols;

epoxy compounds; polyamine compounds; condensation products from polyamine compounds and haloepoxy compounds; and alkylene carbonate compounds.

Furthermore, in the case where the polyhydric alcohols that are conventionally known to easily be granulated are used, the present invention process in which the surface-crosslinking is carried out at the same time as the pulverization is the most preferable for preventing the property deterioration accompanying granulation fracture that might occur after surface-crosslinking or for preventing the powder dust generation, so the polyhydric alcohol is most preferably used as the surface-crosslinking agent or organic solvent in the present invention, and further, it is more preferable to jointly use at least two polyhydric alcohols.

Incidentally, when one or more polyhydric alcohols are used, whether the polyhydric alcohol as added to the neighborhood of the surface of the water-absorbent resin powder serves as the surface-crosslinking agent or organic solvent is fitly determined by factors such as the water content of the water-absorbent resin powder and the reaction temperature or time. Then, when two or more polyhydric alcohols are used, their reactivity or permeability to the water-absorbent resin are different, and some of them serve rather like the solvent, and the others serve rather like the crosslinking agent, whereby surface-crosslinking to give higher properties is achieved. In addition, when two or more polyhydric alcohols are used, the number of the carbon atoms therein is in the range of preferably 2 to 15, more preferably 3 to 10, still more preferably 3 to 8, and particularly preferably 3 to 5, in view of the resultant properties.

The above surface-crosslinking agents may be used either alone respectively or in combinations with each other. When two or more surface-crosslinking agents are used jointly with each other, a water-absorbent resin with still more excellent water absorption properties is obtainable by combining a first and a second surface-crosslinking agent which have solubility parameters (SP values) (as exemplified in documents such as U.S. Pat. No. 5,422,405) different from each other. Incidentally, the above-mentioned solubility parameter is a value as commonly used as a factor showing the polarity of compounds.

The above-mentioned first surface-crosslinking agent is a compound which is reactive upon a carboxyl group of the water-absorbent resin and has a solubility parameter of 12.5 $(cal/cm^3)^{1/2}$ or more. Examples of the first surface-crosslinking agent include glycerol and propylene glycol. The above-mentioned second surface-crosslinking agent is a compound which is reactive upon a carboxyl group of the water-absorbent resin and has a solubility parameter less than 12.5 $(cal/cm^3)^{1/2}$. Examples of the second surface-crosslinking agent include ethylene glycol diglycidyl ether and butanediol.

The ratio of the surface-crosslinking agent, as used, to the water-absorbent resin depends on factors such as combinations of the water-absorbent resin and the surface-crosslinking agent, but is usually in the range of 0.01 to 5 weight parts, preferably 0.05 to 3 weight parts, per 100 weight parts of the water-absorbent resin standing in a dry state. If the surface-crosslinking agent is used in the above range, the water absorption properties of body fluids (aqueous liquids) such as urine, sweat and menstrual blood can be still more improved. In the case where the amount of the surface-crosslinking agent as used is smaller than 0.01 weight part, the crosslinking density in the neighborhood of the surface of the water-absorbent resin can hardly be raised. In addition, in the case where the amount of the surface-crosslinking agent as used exceeds 5 weight parts, the surface-crosslinking agent is excessive, and this is uneconomical, and further, it might be difficult to control the crosslinking density to a proper value.

In addition, specified examples of usable organic solvents include: lower alcohols such as methyl alcohol, ethyl alcohol, n-propyl alcohol, iso-propyl alcohol, n-butyl alcohol, iso-butyl alcohol, and t-butyl alcohol; ketones such as acetone; ethers such as dioxane, ethylene oxide (EO) adducts of monohydric alcohols, and tetrahydrofuran; amides such as N,N-dimethylformamide and ε-caprolactam; and sulfoxides such as dimethyl sulfoxide. These organic solvents may be used either alone respectively or in combinations with each other. In addition, the above polyhydric alcohol is also usable as the organic solvent.

The ratio of the hydrophilic solvent, as used, to the above water-absorbent resin and the above surface-crosslinking agent depends on factors such as combinations of the water-absorbent resin or the surface-crosslinking agent with the hydrophilic solvent, but is usually 200 weight parts or below, preferably in the range of 0.001 to 50 weight parts, more preferably 0.1 to 50 weight parts, particularly preferably 0.5 to 20 weight parts, per 100 weight parts of the water-absorbent resin.

In the present invention, for example, a water-absorbent resin mixture is prepared by mixing 100 weight parts of the water-absorbent resin powder with the following materials: 0.01 to 5 weight parts, preferably 0.05 to 3 weight parts, of the surface-crosslinking agent; 200 weight parts or below, preferably 0.001 to 50 weight parts, more preferably 0.1 to 50 weight parts, particularly preferably 0.5 to 20 weight parts, of the organic solvent; and 0.1 to 30 weight parts, preferably 0.5 to 10 weight parts, of water. Then, the resultant water-absorbent resin mixture may be subjected to surface-crosslinking simultaneously with the above pulverization.

The method for adding the crosslinking agent is not especially limited, and may be carried out such that the crosslinking agent is added to a water-absorbent resin as dispersed in an inert solvent, but in a preferable method, a crosslinking agent reactable upon carboxyl group is dissolved or dispersed into the hydrophilic solvent, and the resultant solution or dispersion is then sprayed or dropped to the particle mixture, thereby mlxing them.

As to the pulverization as carried out at the same time as the surface-crosslinking in the present invention, the pulverization step is not set separately, but may, for example, be carried out by applying sufficient mixing power or pressure, not less than conventional cases, to the water-absorbent resin powder until the resin powder becomes pulverized when the crosslinking agent is mixed or when the crosslinking reaction is carried out by heating. Incidentally, in the case where the pulverization or classification is carried out before heating after mixing the crosslinking agent, the properties are hardly improved. Therefore, the pulverization or classification as carried out at such a time is not intended in the present invention.

Incidentally, the pulverization in the present invention can preferably be defined most briefly by the reduction of the weight-average particle diameter from the water-absorbent resin powder, which has not been surface-crosslinked yet, to the water-absorbing agent which has been surface-crosslinked, but, besides, also can be defined by the below-mentioned generation and increase of fine particles or by the below-mentioned increase of the specific surface area. In conventional surface-crosslinking, the influence of the surface-crosslinking agent or the granulation is so dominant that the above phenomena cannot be seen, but the present invention is characterized in that pulverization exceeding granulation is carried out. That is to say, the present invention displays a phenomenon that when pulverization is carried out the weight-average particle diameter decreases, which phenomenon is not seen in conventional surface-crosslinking (in which, usually, granulation is carried out, whereby the particle diameter increases). In addition, besides, the pulverization in the present invention also can be defined by the increase of fine particles or by the increase of the specific surface area.

The mixing apparatus, as used for mixing the water-absorbent resin and the surface-crosslinking agent, preferably has a great mixing force to mix both uniformly and surely. Preferable examples of the above mixing apparatus include: cylinder type mixers, double-wall cone type mixers, high-speed agitation type mixers, V-character-shaped mixers, ribbon type mixers, screw type mixers, fluidized-furnace rotary disk type mixers, gas current type mixers, double-arm type kneaders, internal mixers, pulverizing type kneaders, rotary mixers, and screw type extruders.

Next, in the present invention, the surface-crosslinking is carried out while the powder is pulverized. The apparatus, as used for the pulverization simultaneously with surface-crosslinking in the present invention, is different according to the following factors: the structure of the apparatus, the mechanical strength of the water-absorbent resin as used, the operational conditions of the apparatus, and the composition of the crosslinking agent; but examples thereof include various kinds of pulverizing machines and mixing machines with the pulverizing function.

Examples of usable apparatuses include the following apparatuses: cylinder type mixers, doublewall cone type mixers, V-character-shaped mixers, ribbon type mixers, meat choppers, screw type mixers, fluidized-furnace rotary disk type mixers, gas current type mixers, double-arm type kneaders, internal mixers, pulverizing type kneaders, rotary mixers, and screw type extruders. For example, these mixers are fitly provided with the pulverization function, or jointly used with ball mills, or the shape of agitation vanes or inner walls or the clearance is provided with the pulverization function, and thus the apparatuses are operated under conditions where the pulverization of the water-absorbent resin can be observed.

That is to say, in the present invention, the water-absorbent resin powder partides are so sufficiently stirred with the above mixer that the pulverization exceeding the granulation can be seen when the water-absorbent resin powder standing after surface-crosslinking is compared with that standing before surface-crosslinking.

In addition, the above pulverization during surface-crosslinking might be difficult at or below room temperature. Thus, it is preferable that the pulverization during surface-crosslinking is carried out under external heating. It is preferable that the above apparatus can be heated from outside using heat sources such as jackets, hot air, infrared rays, and microwave. The treatment temperature or time for the pulverization of the water-absorbent resin during surface-crosslinking may fitly be selected according to factors such as combinations of the water-absorbent resin with the surface-crosslinking agent and the desired crosslinking density, and are therefore not especially limited. However, for example, the treatment temperature is in the range of preferably 50 to 250° C., more preferably 100 to 200° C.

For the purpose of favorably carrying out the pulverization to achieve high properties, it is preferable that the pulverization of the powder during surface-crosslinking is carried out under a load of 20 g/cm$^2$ or in the presence of a ball mill.

Materials of the ball mill usable to carry out the pulverization in the present invention, for example, have heat resistance of usually 100° C. or higher, preferably 200° C. or higher, more preferably 300° C. or higher, and specifically, the water-absorbent resin may be stirred in the presence of iron balls. As to the ball mill, the shape is not especially limited if it enables pulverization, and further, the size is in the range of usually 1 to 100 mm, preferably 5 to 50 mm, and the amount is in the range of usually 1 to 1,000 weight %, preferably 10 to 100 weight %, of the water-absorbent resin.

In addition, the pressure under which the pulverization is carried out in the present invention is preferably 20 g/cm$^2$ or higher at the lower portion of the water-absorbent resin, and the load may be applied by covering the upper portion of the resin, or the lower portion of the resin may be pressured by the own weight of the resin by piling up the resin vertically high. If when the resin is pressured by its own weight the resin is piled up to the level of usually 50 cm or higher, preferably 100 cm or higher, then the face pressure can be adjusted by the specific bulk gravity of the water-absorbent resin powder (e.g. 0.6 g/cc).

In addition, when the pulverization is carried out, it is preferable that the particles of the water-absorbent resin are stirred at high speed under a fit load in the aforementioned mixers or heating-treatment apparatuses. In addition, the stirring may be made under conditions where the pulverization index of the below-mentioned equation for the water-absorbent resin is in the range of usually 1,000 or more, preferably 2,000 to 100,000, more preferably 3,000 to 50,000.

(Pulverization index)=(face pressure to water-absorbent resin powder: A)×(revolution number: B)×(stirring time: C)

wherein:
A: pressure (g/cm2) which is applied to the water-absorbent resin powder in the lower portion of the mixer and is in the range of preferably 5 or higher, more preferably 20 to 500;
B: revolution number per minute (rpm) of the mixer, which is in the range of preferably 2 or higher, more preferably 8 to 2,000;
C: residence time (minutes) of the water-absorbent resin powder in the mixer, which is in the range of preferably 10 or higher, more preferably 15 to 100.

When the water-absorbent resin powder is pulverized during surface-crosslinking to pulverize at least part of particles of the resin powder, it is preferable that the amount of fine particles of 150 $\mu$m or below as generated by this pulverization of the resin powder is at most 10 weight % of the entire resin powder.

It is conventionally known that the fine particles of 150 $\mu$m or below are not preferable for the surface-crosslinking of the water-absorbent resin, but there are also problems in that when the amount of the fine particles is decreased, the water absorption speed falls. In comparison with this, the present invention solves such problems of the water absorption speed by lessening the fine particles of 150 $\mu$m or below to a small amount, specifically, 10 weight % or below, before surface-crosslinking, thus carrying out uniform surface-crosslinking, and further by generating and increasing the fine particles during surface-crosslinking. The amount of the fine particles, as generated, is in the range of preferably 0.5 to 6 weight %, more preferably 1 to 5 weight %, considering the resultant properties. In addition, the amount of the fine particles in the water-absorbent resin resultant from the pulverization is also preferably 10 weight % or below.

In the case where the amount of the fine particles, as generated, is too large, the absorption capacity under a load deteriorates, and in the case where the above amount is too small, the deceleration of the water absorption speed is seen. A way preferable for reducing the fine particle content prior to surface-crosslinking is to use either one or both of the aforementioned (b) coarse particles with a certain particle size and (c) granular powder. In the case of (b), the amount of the fine particles as generated by the pulverization is small, and in the case of (c), the fine particles can be granulated.

In addition, as is mentioned above, in the present invention, the generation of the fine particles of 150 $\mu$m or below is suppressed to preferably 10 weight % or below by pulverization of the resin powder during surface-crosslinking. In such case, the BET specific surface area of the water-absorbent resin increases. The pulverization of the resin powder during surface-crosslinking increases the BET specific surface area of the resin powder to preferably 1.05 to 10 times, more preferably 1.05 to 2 times. In the case where the ratio of increase in the surface area is too small or too great, there are disadvantages to the improvement of the water absorption speed or the absorption capacity under a load, respectively. The above preferable increase in the surface area needs application of certain or greater mechanical stress to the resin powder until the resin powder becomes pulverized. This can more easily be achieved if the water-absorbent resin powder is a resin having the specific bulk gravity of 0.6 to 0.1 (g/cc) before surface-crosslinking and if the water-absorbent resin powder is porous before surface-crosslinking. Incidentally, the specific surface area can be determined by comparing the BET specific surface areas, standing before and after the reaction respectively, with each other in regard to the water-absorbent resin powder as coated with the surface-crosslinking agent.

In addition, the method to most briefly define the pulverization according to the present invention is the reduction of the weight-average particle diameter. The weight-average particle diameter can be compared by carrying out classification with a screen for the water-absorbent resin powder before and after surface-crosslinking. It is conventionally known that the surface-crosslinking of the water-absorbent resin increases the weight-average particle diameter, but otherwise in the present invention, the weight-average particle diameter is reduced by the surface-crosslinking. The reduction of the weight-average particle diameter in the present invention is in the range of preferably 1~50%, more preferably 2 to 20%, still more preferably 3 to 15%, most preferably 4 to 10%. In the case where the reduction of the weight-average particle diameter is too great, the absorption capacity under a load is not improved, and in the case where the reduction of the weight-average particle diameter is too small, the water absorption speed or impact resistance is not improved. In addition, the reduction of the weight-average particle diameter may fitly be adjusted such that the weight-average particle diameter of the water-absorbing agent resultant from the pulverization during surface-crosslinking can fall in the range of preferably 100 to 600 $\mu$m, more preferably 300 to 600 $\mu$m, particularly preferably 400 to 600 $\mu$m.

In the present invention in which the pulverization is carried out simultaneously with the surface-crosslinking in the above way, the particle size is beforehand regulated, so the classification is not especially carried out.

In addition, in the surface-crosslinking process according to the present invention, it is preferable that the granulation of the water-absorbent resin powder is also carried out while the water-absorbent resin powder is pulverized. The granulation can be carried out by fitly adjusting the composition of the surface-crosslinking agent, for example, using a predetermined or larger amount of water, and further by fitly adjusting the pulverization conditions or apparatuses such that all aggregated particles will not be destroyed. The improvement of the water absorption speed and the optimization of the particle size distribution can also be achieved by granulation after pulverization during surface-crosslinking.

The amount of water, used in the present invention, is in the range of 0.1 to 30 weight parts, preferably 0.5 to 10 weight parts, per 100 weight parts of the water-absorbent resin powders in view of the absorption capacity under a load, further, in view of the pulverization and granulation efficiencies of the water-resin powder. In the case where the amount of water is too large, the pulverization is difficult, and in the case where the amount of water is too small, the granulation is difficult. In addition, in the present invention, it is preferable for the efficient granulation that the polyhydric alcohol is used as an essential component of the surface-crosslinking agent.

Incidentally, the present invention is characterized in that the surface-crosslinking is carried out simultaneously with the pulverization of the water-absorbent resin powder, and more preferably the granulation of the resin powder is also carried out simultaneously. The occurrence of pulverization and granulation can be confirmed from the change of the particle size distribution or specific surface area due to surface-crosslinking, or from electron micrographs (magnifying power range: about 30 to about 50 times) of the water-absorbent resin before and after surface-crosslinking respectively. In addition, the granulation can be confirmed not only from the electron micrographs, but also from the granulation ratio, which can be determined by pulverizing the water-absorbent resin powder alone as the control with no use of the surface-crosslinking agent or its solution which are binders for granulation, and by comparing the resultant particle size with that resultant from the use of the surface-crosslinking agent or its solution. The granulation ratio, as determined from the particle size distribution, is in the range of preferably 1 weight % or above, more preferably 1 to 10 weight %.

If necessary, various functions may be given to the above-obtained present invention water-absorbent resin by adding thereto the following materials: deodorants, perfumes, various inorganic powders, foaming agents, pigments, dyes, hydrophilic short fibers, plasticizers, pressure sensitive adhesives, surface-active agents, manure, oxidants, reductants, water, and salts.

(Effects and Advantages of the Invention):

The present invention has advantages in that because the water-absorbent resin before being mixed with the surface-crosslinking agent has a large particle diameter and contains only a small quantity of fine particles, it is easy to uniformly mix such a resin with the surface-crosslinking agent, but in that because the pulverization is carried out in the surface-crosslinking step, the water absorption speed is also increased. That is to say, because in the present invention the water-absorbent resin powder is further pulverized after being uniformly mixed with the surface-crosslinking agent, the present invention can give a water-absorbent resin having high water absorption speed and high absorption capacity under a load.

DETAILED DESCRIPTION OF THE PREFERRED EMBODIMENTS

Hereinafter, the present invention is more specifically illustrated by the following examples of some preferred embodiments in comparison with comparative examples not according to the invention. However, the invention is not limited to these examples. Incidentally, the properties of the water-absorbent resin were measured by the following methods:

(1) Water absorption amount under no load of water-absorbent resin:

First, 0.2 g of water-absorbent resin was uniformly placed into a tea bag type bag (6 cm×6 cm), of which the opening was then sealed by heating, and the bag was then immersed into a 0.9 weight % aqueous sodium chloride solution (physiological salt solution). Sixty minutes later, the bag was drawn up and then drained at 250 G for 3 minutes with a centrifuge, and the weight $W_1$ (g) of the bag was then measured. On the other hand, the same procedure was carried out using no water-absorbent resin, and the resultant weight $W_0$ (g) was measured. Thus, the water absorption amount (g/g) under no load was calculated from these weights $W_1$ and $W_0$ in accordance with the following equation a:

Equation a: water absorption amount (g/g)=($W_1$−$W_0$)/(weight of water-absorbent resin) (g)

(2) Water absorption speed of water-absorbent resin:

First of all, 1.0 g of water-absorbent resin was put into a cylindrical polypropylene cup of 50 mm in inner diameter and 70 mm in height having a bottom. Next, 28 g of physiological salt solution was poured into the cup. Then, the time, which passed since the physiological salt solution was poured until the physiological salt solution was entirely absorbed by the water-absorbent resin and thus became invisible, was measured. This measurement was repeated 3 times, and their average value was regarded as the water absorption speed (second).

(3) Solid content (water content) of water-absorbent resin:

First of all, 1.000 g of water-absorbent resin was put into an aluminum cup (inner diameter 53 mm, height 23 mm) and dried in a wind-free oven of 180° C. for 3 hours to measure and calculate the water content and solid content (weight %) of the water-absorbent resin from the drying loss.

(4) Weight-average particle diameter and particle size distribution of water-absorbent resin:

The water-absorbent resin was sieved and classified with JIS standard screens (mesh sizes: 850 μm, 600 μm, 300 μm, 150 μm, and 106 μm), and then the percentage of the residue, R, was plotted on logarithmic probability paper to regard a particle diameter corresponding to R=50 weight % as the weight-average partides diameter. Incidentally, when the weight-average particle diameter is determined, it is preferable that four or more screens are used, and if necessary, screens with mesh sizes such as 710 μm, 500 μm, 425 μm, 355 μm, 200 μm, and 75 μm may be used.

(5) Specific surface area of water-absorbent resin:

The specific surface area of the water-absorbent resin was determined by the "B.E.T. single-point method (Brunauer-Emmett-Teller adsorption method)." "Analyte full automatic specific surface area measurement apparatus 4-Sorb UC" (made by Yuasa Ionics Co., Ltd.) was used as the measurement apparatus. First of all, the water-absorbent resin (as sampled with JIS standard screens beforehand) was filled into a microcell (TYPE: QS-400) of about 13 cm³ in capacity, and the microcell containing the sample was heated to 150° C. under a nitrogen gas current to degas and dehydrate the sample sufficiently. Next, the microcell containing the sample was cooled to −200° C. under a mixed-gas current including helium gas and 0.1% klypton gas, and the sample was allowed to adsorb the mixed gas until equilibrium was established. Thereafter, the temperature of the microcell containing the sample was reverted to room temperature, and the mixed gas was eliminated from the sample to determine the specific surface area of the water-absorbent resin from the amount of the krypton-mixed gas as eliminated. Incidentally, the adsorption-elimination step of the microcell containing the sample was carried out 3 times to determine the specific surface area (m²/g) of the water-absorbent resin from the average amount.

(6) Absorption capacity under load of water-absorbent resin:

Hereinafter, first, the measurement apparatus as used for measuring the absorption capacity under a load is simply explained while referring to FIG. 1.

As is shown in FIG. 1, the measurement apparatus comprises: a scale 1; a vessel 2 of a predetermined capacity as mounted on the scale 1; an air-inhaling pipe 3; an introducing tube 4; a glass filter 6; and a measurement part 5 as mounted on the glass filter 6. The vessel 2 has an opening part 2a on the top and an opening part 2b on the side. The air-inhaling pipe 3 is inserted in the opening part 2a, and the introducing tube 4 is fitted to the opening part 2b. In addition, the vessel 2 contains a predetermined amount of physiological salt solution 11. The lower end part of the air-inhaling pipe 3 is submerged in the 0.9 weight % physiological salt solution 11. The glass filter 6 is formed in a diameter of 70 mm. The vessel 2 and the glass filter 6 are connected to each other through the introducing tube 4. In addition, the upper part of the glass filter 6 is fixed so as to be located a little higher than the lower end of the air-inhaling pipe 3.

The measurement part 5 comprises: a filter paper 7; a supporting cylinder 8; a wire net 9 as attached to the bottom of the supporting cylinder 8; and a weight 10; and the measurement part 5 is formed by mounting the filter paper 7 and the supporting cylinder 8 (i.e. wire net 9) in this order on the glass filter 6 and further mounting the weight 10 inside the supporting cylinder 8, namely, on the wire net 9. The supporting cylinder 8 is formed in an inner diameter of 60 mm. The wire net 9 is made of stainless steel and formed in 400 mesh according to JIS (mesh size: 38 μm). An arrangement is made such that a predetermined amount of water-absorbent resin can uniformly be spread on the wire net 9. The weight 10 is adjusted in weight such that a load of 50 g/cm² can uniformly be applied to the wire net 9, namely, to the water-absorbent resin.

The absorption capacity under a load was measured with the measurement apparatus having the above-mentioned constitution. The measurement method is hereinafter explained.

First, predetermined preparatory operations were made, in which, for example, a predetermined amount of the physiological salt solution 11 was placed into the vessel 2, and the air-inhaling pipe 3 was inserted into the vessel 2. Next, the filter paper 7 was mounted on the glass filter 6. On the other hand, in parallel with these mounting operations, 0.9 g of water-absorbent resin was uniformly spread inside the supporting cylinder, namely, on the wire net 9, and the weight 10 was put on this water-absorbent resin. Next, the wire net 9, namely, the supporting cylinder 8 (in which the water-absorbent resin and the weight 10 were put), was mounted on the filter paper 7. Then, weight $W_2$ (g) of the physiological salt solution 11, as absorbed by the water-absorbent resin over a period of 60 minutes since the supporting cylinder 8 had been mounted on the filter paper 7, was measured with the scale 1. Then, the absorption capacity (g/g) under a load, at 60 minutes after the initiation of the absorption, was calculated from the above weight $W_2$ in accordance with the below-mentioned equation b and regarded as the absorption capacity (g/g) under a load (50 g/cm$^2$).

Equation b: absorption capacity (g/g) under load=(weight $W_2$ (g))/ (weight (g) of water-absorbent resin)

(7) Water-soluble content of water-absorbent resin:

First, 0.5 g of water-absorbent resin was dispersed into 1,000 ml of deionized water and stirred for 16 hours, and then the resultant swollen gel was filtered with filter paper. Then, the content of water-soluble polymer in the resultant filtrate, namely, the water-soluble content as eluted from the water-absorbent resin (weight % relative to the water-absorbent resin), was determined by colloid titration.

(8) Specific bulk gravity of water-absorbent resin:

An apparent density meter (according to JIS K3362 6.2) was mounted on a stable stand horizontally, and 100.0 g of water-absorbent resin was put into an upper funnel of the apparent density meter and dropped freely into an acrylic resin cup of 100 cc in capacity (its own weight (g) was already known) (this cup according to JIS K3362 6.2). A portion of the dropped water-absorbent resin, standing above the upper end of the cup, was scraped off gently with a glass rod, and the weight (g) of the cup was measured by the 0.01 g, whereby the weight (g) of the water-absorbent resin per 100 cc thereof was determined and then divided by the capacity (100 cc) of the cup. The resultant value was regarded as the specific bulk gravity (g/cc).

PRODUCTION EXAMPLE 1

Figure 3:
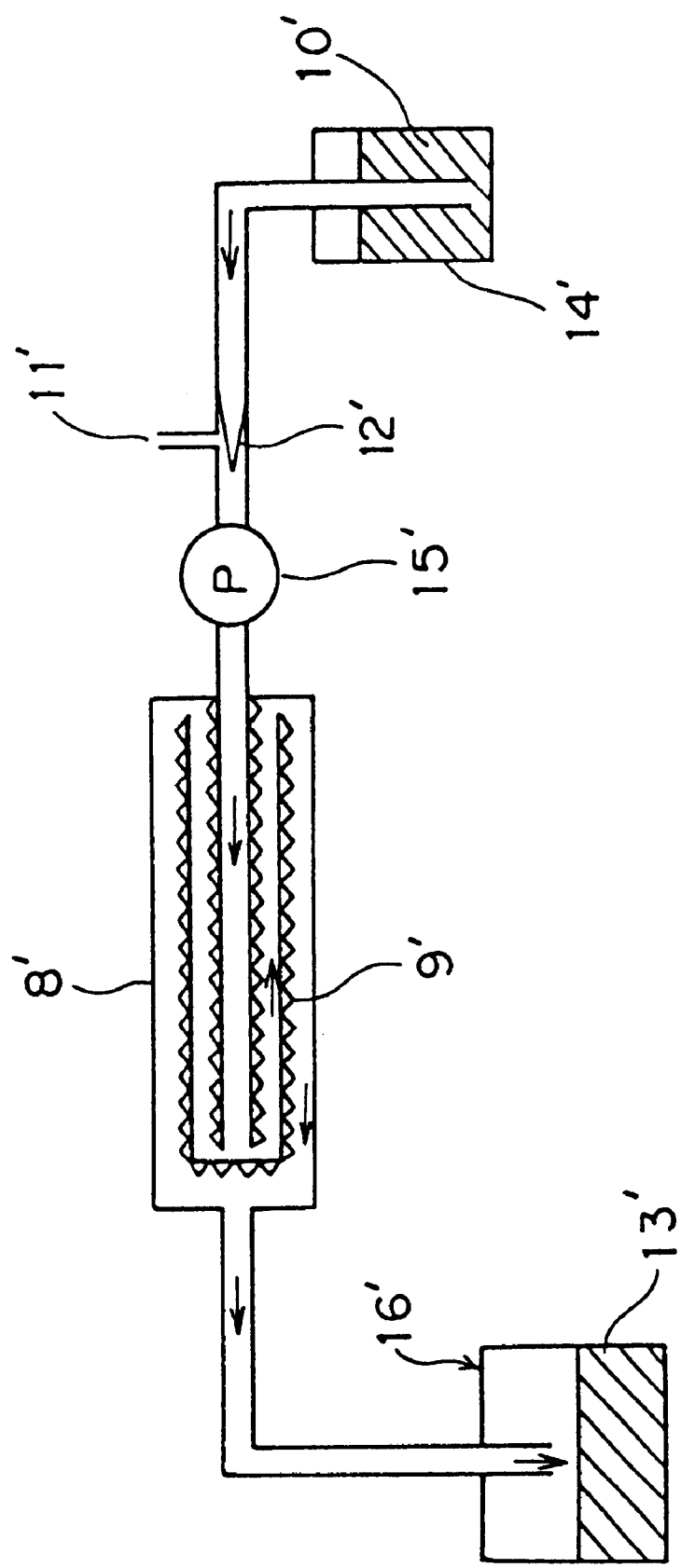
FIG. 3 illustrates a section of the mixing area having irregularities in a clearance as used in Production Example 1.

An aqueous monomer solution was prepared by mixing 305 g of acrylic acid, 3,229.5 g of a 37 weight % aqueous sodium acrylate solution, 12.4 g of polyethylene glycol (n=8) diacrylate as the internal-crosslinking agent, 0.15 g of polyoxyethylene sorbitan monostearate (trade name; Rheodol TW-S120 made by Kao Co., Ltd.) as the surface-active agent, 1,331.1 g of pure water, and 20.3 g of a 10 weight % aqueous sodium persulfate solution together. This aqueous monomer solution and nitrogen were fluid-mixed using Whip Auto Z made by Aikosha Co., Ltd., thereby dispersing nitrogen foams into the aqueous monomer solution to adjust the aqueous monomer solution in a foam-dispersed state. Specifically, as is shown in FIG. 3, this aqueous monomer solution 10 was supplied from a nozzle side at a rate of 1 kg per minute using an aspirator 12', while nitrogen gas 11 was supplied from a side tube at a rate of 2 L per minute, thus fluid-mixing both. The resultant mixture was further passed through a mixing area 8' having irregularities (projections) 9' and led to a polymerization cistern 16'. Nitrogen foams were dispersed in the aqueous monomer solution 10' as passed the mixing area 8', and the volume of this aqueous monomer solution 10' increased to 1.5 times. Then, 101.6 g of a 2 weight % aqueous sulfurous acid solution was added to this aqueous monomer solution 13 containing foams to initiate polymerization at once. Subsequently, static polymerization was carried out at the temperature of 25 to 95° C. in a foam-dispersed state for 1 hour. After this polymerization, the resultant spongy hydrogel polymer containing a large quantity of foams was cut into squares of 10~30 mm and then dried in a hot-air dryer of 160° C. for 2 hours. The resultant dry product was pulverized with a pulverizer and then classified into what passed a screen having a mesh size of 850 μm, thus obtaining porous water-absorbent resin powder (1) having a weight-average particle diameter of 310 μm. This water-absorbent resin powder (1), as obtained by foaming polymerization, had a water absorbent amount of 41.8 (g/g), a water-soluble content of 8 weight %, a solid content of 95.4 weight %, and a specific bulk gravity of 0.4 g/cc.

PRODUCTION EXAMPLE 2

An aqueous monomer solution was prepared by dissolving 0.03 mol % (based on the monomer) of polyethylene glycol (n=8) diacrylate as the internal-crosslinking agent into 6,000 g of an aqueous solution of partially (75 mol %) neutralized sodium acrylate of 33 weight % in concentration, and then nitrogen gas was blown into this aqueous monomer solution to remove dissolved oxygen therefrom. Next, the aqueous monomer solution was poured into a twin-arm type kneader of 10 liters in capacity, and then 0.14 g/mol (based on the monomer) of sodium persulfate and 0.005 g/mol (based on the monomer) of L-ascorbic acid were added in the form of an aqueous solution into the kneader, of which the contents were stirred under a nitrogen gas current, to carry out the stirring polymerization while the resulting polymer gel was pulverized. After 1 hour, the resultant unfoamed hydrogel polymer of about 1 mm was got out of the kneader and then dried in a hot-air dryer of 160° C. for 1 hour. The resultant dry product was pulverized with a pulverizer and then classified into what passed a screen having a mesh size of 850 μm, thus obtaining water-absorbent resin powder (2) having a weight-average particles diameter of 400 μm. This water-absorbent resin powder (2) was unfoamed and non-porous and had a water absorbent amount of 50.0 (g/g), a water-soluble content of 20.0 weight %, a solid content of 94 weight %, and a specific bulk gravity of 0.66 g/cc.

EXAMPLE 1

Water-absorbent resin powder (1), as obtained in Production Example 1, was classified with JIS standard screens of 850 to 600 μm, and 100 weight parts of the resultant classification product was mixed with 18.09 weight parts of a crosslinking agent solution comprising 0.09 weight part of ethylene glycol diglycidyl ether, 3 weight parts of propylene glycol, 9 weight parts of water, and 6 weight parts of isopropyl alcohol. The mixture as obtained in this way had a BET specific surface area of 0.0275 m$^2$/g. Next, this mixture was added into a mortar mixer as provided with pulverization function by the shape of agitation vanes (horn shape) and by the clearance (about 0.1~about 10 mm), and then the mixture was heated at 210° C. for 35 minutes while agitated along with iron balls for pinballs (ball mill) as the pulverization promotor at high speed (spinning movement of 285 rpm and movement like revolution of planets round the sun of 125 rpm) effective for pulverization.

As to water-absorbing agent (1) as obtained in this way, the pulverization during surface-crosslinking increased the specific surface area to 0.0302 m$^2$/g (1.10 times of that before surface-crosslinking), and generated and increased fine particles of 150 μm or below by 1 weight %. In addition, pulverization and granulation of the powder were confirmed from electron micrographs of water-absorbing agent (1). Water-absorbing agent (1) had a water absorption capacity of 34.0 (g/g) under no load, an absorption capacity of 16.3 (g/g) under a load, and a water absorption speed of 44 seconds. In addition, the weight-average particle diameter reduced from 700 μm to 660 μm.

EXAMPLE 2

Water-absorbing agent (2) was obtained in the same way as of Example 1 except that the high-speed agitation time in the mortar mixer having pulverization function was extended to 50 minutes. As to the resultant water-absorbing agent (2), the pulverization during surface-crosslinking further increased the specific surface area to 0.0334 m$^2$/g (1.21 times of that before surface-crosslinking), and generated and increased fine particles of 150 µm or below by 2 weight %. In addition, pulverization and granulation of the powder were confirmed from electron micrographs of water-absorbing agent (2). Water-absorbing agent (2) had a water absorption capacity of 32.1 (g/g) under no load, an absorption capacity of 19.3 (g/g) under a load, and a water absorption speed of 42 seconds, and thus was further improved when compared with water-absorbing agent (1). In addition, the weight-average particle diameter reduced to 640 µm.

EXAMPLE 3

Water-absorbent resin powder (1), as obtained in Production Example 1, was classified with JIS standard screens of 600 to 300 µm, and 100 weight parts of the resultant classification product was mixed with 18.09 weight parts of a crosslinking agent solution comprising 0.09 weight part of ethylene glycol diglycidyl ether, 3 weight parts of propylene glycol, 9 weight parts of water, and 6 weight parts of isopropyl alcohol. The mixture as obtained in this way had a BET specific surface area of 0.0372 m$^2$/g. Next, this mixture was added into a mortar mixer as provided with pulverization function by the shape of agitation vanes (horn shape) and by the clearance (about 0.1 to about 10 mm), and then the mixture was heated at 210° C. for 45 minutes while agitated along with iron balls for pinball (ball mill) as the pulverization promotor at high speed (spinning movement of 285 rpm and movement like revolution of planets round the sun of 125 rpm) effective for pulverization. As to water-absorbing agent (3) as obtained in this way, the pulverization during surface-crosslinking increased the specific surface area to 0.0391 m$^2$/g (1.05 times of that before surface-crosslinking), and generated and increased fine particles of 150 µm or below by 1 weight %. In addition, pulverization and granulation of the powder were confirmed from electron micrographs of water-absorbing agent (3). Water-absorbing agent (3) had a water absorption capacity of 28.5 (g/g) under no load, an absorption capacity of 22.9 (g/g) under a load, and a water absorption speed of 35 seconds. In addition, the weight-average particle diameter reduced from 450 µm to 410 µm

COMPARATIVE EXAMPLE 1

Comparative water-absorbing agent (1) was obtained in the same way as of Example 3 except that the mixture, as obtained by mixing 18.09 weight parts of the aqueous crosslinking agent solution, was heated at 210° C. for 50 minutes in a static oven as substituted for the mortar mixer having pulverization function. As to the resultant comparative water-absorbing agent (1), the specific surface area decreased to 0.0359 m$^2$/g (0.97 times of that before surface-crosslinking), and no fine particles of 150 µm or below were seen, because the granulation was carried out without pulverization during surface-crosslinking. The weight-average particle diameter increased to 500 µm, and comparative water-absorbing agent (1) had a water absorption capacity of 28.9 (g/g) under no load, an absorption capacity of 20.7 (g/g) under a load, and a water absorption speed of 41 seconds.

Thus, comparative water-absorbing agent (1) was much inferior to water-absorbing agent (3).

COMPARATIVE EXAMPLE 2

Water-absorbent resin powder (2), as obtained in Production Example 2, was classified with JIS standard screens of 500~300 µm, and 100 weight parts of the resultant classification product was mixed with 6.03 weight parts of an aqueous crosslinking agent solution comprising 0.03 weight part of ethylene glycol diglycidyl ether, 1 weight part of propylene glycol, 3 weight parts of water, and 2 weight parts of isopropyl alcohol. The mixture as obtained in this way had a BET specific surface area of 0.0174 m$^2$/g. Next, this mixture was added into a conventional mortar mixer and then heated at 210° C. for 45 minutes while low-speed agitation was carried out. As to the resultant comparative water-absorbing agent (2), the weight-average particle diameter increased to 450 µm, the specific surface area decreased to 0.0155 m$^2$/g (0.89 times of that before surface crosslinking), and no fine particles of 150 µm or below were seen, because the granulation was carried out without pulverization during surface-crosslinking. Comparative water-absorbing agent (2) had a water absorption capacity of 39.3 (g/g) under no load, an absorption capacity of 19.3 (g/g) under a load, and a water absorption speed of 165 seconds.

PRODUCTION EXAMPLE 3

A aqueous monomer solution was prepared by dissolving polyethylene glycol diacrylate of 0.085 mol % (based on sodium acrylate below) as the internal-crosslinking agent into 5,500 g of an aqueous solution of sodium acrylate with a neutralization ratio of 71.3 mol % (monomer concentration: 39 weight %). Next, this aqueous monomer solution was degassed under a nitrogen gas atmosphere for 30 minutes, and then supplied into a reaction vessel as prepared by capping a stainless-steel-made double-arm type kneader of a capacity of 10 liters having two sigma type vanes and a jacket. While the aqueous monomer solution was maintained at 20° C., the atmosphere inside the reaction system was further replaced with a nitrogen gas. Next, while the vanes were rotated, 35 g of a 10 weight % aqueous sodium persulfate solution and 0.08 g of a 10 weight % aqueous L-ascorbic acid solution were added to the aqueous monomer solution, so that a polymerization reaction got started 1 minute after, and that the reaction system reached the peak temperature 20 minutes after, when the resultant hydrogel polymer had a finely divided size of about 5 mm. Thereafter, the agitation was further continued, and the resultant hydrogel polymer was removed 60 minutes after the initiation of the polymerization.

The resultant finely divided hydrogel polymer was spread on a wire net of 300 µm in mesh size (50 mesh) and dried at 170° C. with hot air for 70 minutes. Then, the resultant dried product was pulverized with a laboratory pulverizer FDS-model (made by Miyako Bussan Co., Ltd.) and further classified with a screen of 850 µm, thus obtaining crosslinked polyacrylic acid salt particles (B) of 96 weight % in solid content and of the irregular pulverized shape.

Next, the resultant crosslinked polyacrylic acid salt partides (B) of the irregular pulverized shape were classified with screens of 850 µm and 150 µm in mesh size, thus obtaining powder (B1) (comprising primary particles) with a particle diameter of substantially 850 to 150 µm and fine powder (B2) with a particle diameter of 150 µm or below.

PRODUCTION EXAMPLE 4

Two hundred grams of crosslinked polyacrylic acid salt fine particles (B2) with a particle diameter of 150 µm or below, as obtained in Production Example 3, were placed into a mortar mixer of 5 liters in capacity made by Nishi Nihon Shikenki Seisakusho K.K. (the temperature of the vessel of 5 liters in capacity was maintained with a bath of 70° C.). While the agitation vanes of the mortar mixer were rotated at high speed (spinning movement of 285 rpm and movement like revolution of planets round the sun of 125 rpm) with 60 Hz/100 V, 300 g of warm water as heated to 90° C. was injected from a funnel at once. As a result the crosslinked polyacrylic acid salt fine particles (B2) and water gave a mixture within 10 seconds, and this mixture was stirred at high speed in the mortar mixer for 3 minutes.

The resultant hydrogel granulation product (particle diameter=about 1 to about 3 mm) was removed and mounted on a wire net of 300 μm in mesh size, and then dried with a hot-air dryer until the water content reduced below 5 weight %.

Next, the resultant dry granulation product was pulverized with the laboratory pulverizer as used in Production Example 3, and the resultant pulverization product was classified into a particle diameter of substantially 850 to 150 μm (but not including 850 μm), thus obtaining granular partides (E) of the crosslinked polyacrylic acid salt fine partides. Granular particles (E) displayed a water absorption capacity of 30 g/g under no load.

Next, granular particles (E) of the crosslinked polyacrylic acid salt fine partides were uniformly mixed with primary partides (B1) with a particle diameter of substantially 850 to 150 μm as obtained in Production Example 3 in a ratio of 8 weight %/92 weight % as (E)/(B1), thus obtaining particle mixture (F), which had the following particle size distribution: 850 to 600 μm=32.1 weight %, 600 to 300 μm=50.4 weight %, 300 to 150 μm=15.3 weight %, what passed 150 μm=2.2 weight %; and which therefore had a weight-average particle diameter of 485 μm.

EXAMPLE 4

Five hundred grams of particle mixture (F) of primary particles and granular particles, as obtained in Production Example 4, was mixed with an aqueous crosslinking agent solution comprising 1,4-butanediol/propylene glycol/water/isopropyl alcohol=0.32/0.50/2.73/0.45 (weight % based on the water-absorbent resin powder). The resultant mixture was heated and stirred in a bath of oil temperature 210° C. for 30 minutes along with 28 iron balls for pinball (total 153 g) as the pulverization promotor in a mixer having pulverization function, thus obtaining water-absorbing agent (4), which had a water absorption capacity of 28 g/g under no load and a water absorption capacity of 25 g/g under a load.

As to the resultant water-absorbing agent (4), the particle size distribution was as follows: 850 to 600 μm=26.7 weight %, 600 to 300 μm=53.9 weight %, 300 to 150 μm=16.5 weight %, what passed 150 μm=2.9 weight % (increased by 0.7 weight %); and the weight-average particle diameter was 450 μm.

EXAMPLE 5

Water-absorbing agent (5) was obtained by adding the same aqueous crosslinking agent solution as that used in Example 4 and by carrying out the crosslinking reaction in the same way as of Example 4 except that the composition of the crosslinking agent was changed from 1,4-butanediol/propylene glycol=0.32/0.50 to only 1,4-butanediol=0.82. The properties and particle size of the resultant water-absorbing agent (5) were almost the same as those obtained in Example 4 (water absorption capacity under no load=28 g/g, water absorption capacity under a load=25 g/g, weight-average particle diameter=450 μm). However, because 1,4-butanediol was used alone as the crosslinking agent, the liquid-permeability (e.g. 24.5 to 50 g/cm$^2$) under a load reduced by about 20%. Incidentally, one of methods for measuring the liquid-permeability under a load is also exemplified in EP 744435.

EXAMPLE 6

The water-absorbent resin, as obtained by mixing the crosslinking agent in Example 4, was laminated up to the height of about 50 cm, thereby applying a load of about 30 g/cm$^2$ to the lower portion of the resin. Then, while the resin was heated at 180° C., the entirety of the resin was stirred at 15 rpm for 40 minutes, thereby carrying out the surface-crosslinking simultaneously with the pulverization at a pulverization index of 18,000. The properties and particle size of the resultant water-absorbing agent (6) were almost the same as those obtained in Example 4 (water absorption capacity under no load=28 g/g, water absorption capacity under a load=25 g/g, weight-average particle diameter=450 μm). In addition, the liquid-permeabity under a load was also the same as that obtained in Example 4.

EXAMPLE 7

Water-absorbent resin powder (1), as obtained in Production Example 1, was further classified and regulated, thus obtaining water-absorbent resin powder (1'), of which the particle size distribution was as follows: 850 to 600 μm=29.6 weight %, 600 to 300 μm=51.7 weight %, 300 to 150 μm=18.7 weight %; and of which the weight-average particle diameter was 470 μm. Then, 100 weight parts of the resultant water-absorbent resin powder (1') was mixed with an aqueous crosslinking agent solution comprising 1,4-butanediol/propylene glycol/water/isopropyl alcohol=0.96/1.50/8.19/1.35 (weight % based on the water-absorbent resin powder). The resultant mixture was heated and stirred in a bath of oil temperature 210° C. for 50 minutes along with 28 iron balls for pinballs (total 153 g) as the pulverization promotor in a mixer having pulverization function, thus obtaining water-absorbing agent (7), which had a water absorption capacity of 30 g/g under no load, a water absorption capacity of 23 g/g under a load, and a water absorption speed of 25 seconds.

In addition, as to the resultant water-absorbing agent (7), the particle size distribution was as follows: 850 to 600 μm=18.6 weight %, 600 to 300 μm=50.4 weight %, 300 to 150 μm=23.6 weight %, what passed 150 μm=7.4 weight %; and the weight-average particle diameter was 400 μm.

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. A surface-crosslinking process for a water-absorbent resin, comprising the steps of:

a) providing a starting dry water-absorbent resin powder, wherein the starting dry water-absorbent resin powder has a weight-average particle diameter of 200 to 1,000 μm;

b) providing a surface-crosslinking agent;

c) mixing the surface-crosslinking agent with the starting dry water-absorbent resin powder to obtain a mixture;

d) pulverizing the mixture; and e) while pulverizing the mixture, carrying out a surface crosslinking reaction between the surface-crosslinking agent and the starting dry water-absorbent resin powder to obtain a dry water-absorbent resin powder product comprising surface-crosslinked particles where a neighborhood of a surface of said particle is crosslinked.

2. A process according to claim 1, wherein the step of pulverizing reduces a weight-average particle diameter of particles of the starting dry water-absorbent resin powder by 1 to 50%.

3. A process according to claim 1, wherein the step of pulverizing generates fine particles of 150 µm or below, and wherein said fine particles are at most 10 weight % of the dry water-absorbent resin powder product.

4. A process according to claim 1, wherein the step of pulverizing of the starting dry water-absorbent resin powder during the step of carrying out a surface crosslinking reaction increases the BET specific surface area of the starting dry water-absorbent resin powder coated with the surface-crosslinking agent to 1.05 to 10 times after surface-crosslinking in comparison to that before surface-crosslinking.

5. A process according to claim 1, wherein the starting dry water-absorbent resin powder has a specific bulk gravity of 0.6~0.1 (g/cc).

6. A process according to claim 1, wherein the starting dry water-absorbent resin powder is porous.

7. A process according to claim 1, wherein 90 weight % or more of the starting dry water-absorbent resin powder comprises coarse particles of 150 µm or more.

8. A process according to claim 1, wherein 25 weight % or more of the starting dry water-absorbent resin powder comprises coarse particles of 600 µm or more.

9. A process according to claim 1, wherein a solid content of the starting dry water absorbent resin powder is above 85 weight %.

10. A process according to claim 1, wherein the step of pulverizing the dry water-absorbent resin powder during surface-crosslinking is carried out under a load of 20 g/cm² or in the presence of a ball mill.

11. A process according to claim 10, wherein the pulverization is carried out at a pulverization index of 1,000 or more, wherein the pulverization index is defined with a mixer which is used when the water-absorbent resin powder is surface-crosslinked while being pulverized as follows:

a) wherein the pulverization index equals (face pressure of water-absorbent resin powder (A))×(number of revolutions per minute (B))×(stiring time (C));

b) wherein A equals the pressure (g/cm²) which is applied to the water-absorbent resin powder in the lower portion of the mixer;

c) wherein B equals the number of revolutions per minute (rpm) of the mixer; and d) wherein C equals a residence time (minutes) of the water-absorbent resin powder in the mixer.

12. A process according to claim 1, wherein the surface-crosslinking agent includes a polyhydric alcohol.

13. A process according to claim 1, wherein the starting dry water-absorbent resin powder has a weight-average particle diameter of 300 to 600 µm and a solid content more than 95 weight %.

14. A surface-crosslinking process for a water-absorbent resin, comprising the steps of:

a) providing a starting dry water-absorbent resin powder, wherein the starting dry water-absorbent resin powder has a weight-average particle diameter of 300 to 600 µm, wherein a solid content of the starting dry water absorbent resin powder is above 85 weight %, and wherein 25 weight % or more of the starting dry water-absorbent resin powder comprises coarse particles of 600 to 1,000 µm;

b) providing a surface-crosslinking agent;

c) mixing the surface-crosslinking agent with the staring dry water-absorbent resin powder to obtain a mixture;

d) carrying out a surface crosslinking reaction between the surface-crosslinking agent and the starting dry water-absorbent resin powder to obtain a dry water-absorbent resin powder product comprising surface-crosslinked particles where a neighborhood of a surface of said particle is crosslinked; and e) wherein the mixture is pulverized while carrying out the surface crosslinking reaction and wherein pulverizing the mixture reduces the weight-average particle diameter of the starting dry water-absorbent resin powder by 1 to 50%.

15. A surface-crosslinking process for a water-absorbent resin, comprising the steps of:

a) providing a starting dry water-absorbent resin powder, wherein 90 weight % or more of the starting dry water-absorbent resin powder comprises coarse particles of 150 µm or more, wherein the starting dry water-absorbent resin powder has a weight-average particle diameter of 300 to 600 µm;

b) providing a surface-crosslinking agent, wherein the surface-crosslinking agent includes at least two polyhydric alcohols having 3 to 8 carbon atoms;

c) mixing the surface-crosslinking agent with the staring dry water-absorbent resin powder, thereby surface-crosslinking particles of the dry water-absorbent resin powder; and d) pulverizing the starting dry water-absorbent resin powder while carrying out surface crosslinking of the particles of the dry water-absorbent resin powder, and wherein the step of pulverizing reduces the weight-average particle diameter of the starting dry water-absorbent resin powder by 1 to 50%.

16. A process according to claim 1, wherein the step of pulverizing the dry water-absorbent resin powder is carried out in a temperature range of 50 to 250° C.

17. A process according to claim 14, wherein the mixer is externally heated such that the dry water-absorbent resin powder is heated in a temperature range of 50 to 250° C.

* * * * *

UNITED STATES PATENT AND TRADEMARK OFFICE
CERTIFICATE OF CORRECTION

PATENT NO.    : 6,254,990 B1
DATED         : July 3, 2001
INVENTOR(S)   : Ishizaki, Kunihiko, Kanto, Teruyuki, Sakamoto, Shigeru, Harada, Nobuyuki and Hitomi, Kazuhisa It is certified that error appears in the above-identified patent and that said Letters Patent is hereby corrected as shown below:

Column 12,
Line 55, "P-naphthalenesulfonic" should be corrected to -- β-naphthalenesulfonic --.

Signed and Sealed this

Ninth Day of July, 2002

Attest:

JAMES E. ROGAN
Attesting Officer    Director of the United States Patent and Trademark Office